US012413889B2

(12) United States Patent
Iwase et al.

(10) Patent No.: US 12,413,889 B2
(45) Date of Patent: Sep. 9, 2025

(54) DRIVER HOLDER, DRIVER MODULE, AND HEADSET

(71) Applicant: FOSTER ELECTRIC COMPANY, LIMITED, Tokyo (JP)

(72) Inventors: Jun Iwase, Tokyo (JP); Chiaki Koike, Tokyo (JP)

(73) Assignee: FOSTER ELECTRIC COMPANY, LIMITED, Tokyo (JP)

(*) Notice: Subject to any disclaimer, the term of this patent is extended or adjusted under 35 U.S.C. 154(b) by 264 days.

(21) Appl. No.: 18/030,528

(22) PCT Filed: Oct. 6, 2021

(86) PCT No.: PCT/JP2021/037052
§ 371 (c)(1),
(2) Date: Apr. 6, 2023

(87) PCT Pub. No.: WO2022/075380
PCT Pub. Date: Apr. 14, 2022

(65) Prior Publication Data

US 2023/0379611 A1 Nov. 23, 2023

(30) Foreign Application Priority Data

Oct. 8, 2020 (JP) ................................ 2020-170811

(51) Int. Cl.
*H04R 1/10* (2006.01)

(52) U.S. Cl.
CPC .................................. *H04R 1/1016* (2013.01)

(58) Field of Classification Search
CPC .. H04R 1/1016; H04R 1/1075; H04R 1/1058; H04R 1/1083; H04R 2460/01
See application file for complete search history.

(56) References Cited

U.S. PATENT DOCUMENTS 9,473,842 B2 10/2016 Shin
2008/0298624 A1 12/2008 Jeong et al.
(Continued)

FOREIGN PATENT DOCUMENTS

JP 2008-109206 A 5/2008
JP 2008-283326 A 11/2008
(Continued)

OTHER PUBLICATIONS

Extended European Search Report in EP Application No. 21877679.7 dated Oct. 7, 2024, 10 pages.
(Continued)

*Primary Examiner* — Tuan D Nguyen
(74) *Attorney, Agent, or Firm* — MARSHALL, GERSTEIN & BORUN LLP

(57) ABSTRACT

A driver holder is disposed inside a housing. This driver holder has a tubular portion formed in a tubular shape, and a driver is accommodated inside the tubular portion. Further, the tubular portion is press-fitted into a module case arranged inside the housing. Here, an opening at one end side in an axial direction of the tubular portion configures a first sound path that communicates the driver with the exterior of the housing. Further, a groove formed at a surface of the tubular portion configures a second sound path which is communicated with the first sound path and extends to a microphone arranged outside the tubular portion.

20 Claims, 19 Drawing Sheets

(56) References Cited

U.S. PATENT DOCUMENTS

| | | | |
|---|---|---|---|
| 2011/0317864 | A1 | 12/2011 | Kaneko et al. |
| 2013/0259288 | A1 | 10/2013 | Shinyama et al. |
| 2016/0142806 | A1 | 5/2016 | Lee et al. |

FOREIGN PATENT DOCUMENTS

| | | | |
|---|---|---|---|
| JP | 2013-211713 | A | 10/2013 |
| JP | 2015-126509 | A | 7/2015 |
| KR | 101762671 | B1 | 8/2017 |
| WO | WO-2008/139931 | A1 | 11/2008 |

OTHER PUBLICATIONS

Search Report and Written Opinion in International Application No. PCT/JP2021/037052 dated Nov. 30, 2021, 8 pages.

Office Action in CN Application No. 202180069058.X dated May 31, 2025, 12 pages.

DRIVER HOLDER, DRIVER MODULE, AND HEADSET

TECHNICAL FIELD

The present disclosure relates to a driver holder, a driver module and a headset.

BACKGROUND ART

Japanese Patent Application Laid-Open (JP-A) No. 2015-126509 discloses a technique of providing a partition portion inside an ear tip that is a part of a headset housing and that corresponds to an ear canal insertion portion, and forming a sound path for a microphone at an outer side of a sound path for a driver. These sound paths respectively communicate the inside of the user's ear canal with a driver accommodation portion and a microphone accommodation portion provided inside the housing.

SUMMARY OF THE INVENTION

Problem to be Solved by the Invention

However, with the technique described in JP-A No. 2015-126509, since the sound path for the microphone is formed by the housing, when attempting to modify the sound path in order to optimize the acoustic characteristics, there is the problem that it cannot be easily modified.

Further, although the sound path for the microphone needs to be sealed, with the technique described in JP-A No. 2015-126509, since multiple parts are assembled to form a housing, there is the problem that it is not easy to effect assembly while ensuring the sealing properties of the sound path. Further, the positional relationship between the driver and the microphone is not stable, and there is the problem that variations due to assembly are likely to occur.

The present disclosure, in consideration of the foregoing problems, aims to provide a driver holder, a driver module, and a headset that facilitate modification of the sound path for a microphone and acquisition of sealing properties, and that exhibit improved ease of assembly.

Means for Solving the Problem

A driver holder according to a first aspect is a driver holder for holding a driver at an interior of a hollow housing, the driver holder including: a tubular portion formed in a tubular shape, the driver being accommodated at an inner side thereof, and the tubular portion being configured to be press-fitted into a holder insertion portion disposed inside the housing; a first sound path configuring an opening at one end side in an axial direction of the tubular portion, and communicating the driver with an exterior of the housing; and a second sound path configured by a groove formed at a surface of the tubular portion, the second sound path being communicated with the first sound path and extending as far as a microphone disposed at an outer side of the tubular portion.

According to the first aspect, the driver holder is disposed inside the housing. This driver holder has a tubular portion formed in a tubular shape, and a driver is accommodated inside the tubular portion. Further, the tubular portion is configured to be press-fitted into a holder insertion portion inside the housing. As a result, the driver arranged inside the housing is held by the driver holder.

Here, an opening at one end side in an axial direction of the tubular portion configures a first sound path that communicates the driver with the housing exterior. As a result, an acoustic signal output by the driver is radiated to the exterior via the first sound path.

A second sound path is formed at a surface of the tubular portion. This second sound path is configured by a groove formed at a surface of the tubular portion, is communicated with the first sound path, and extends to a microphone arranged at an outer side of the tubular portion. As a result, the acoustic signal propagates to the microphone via the first sound path and the second sound path.

According to the foregoing configuration, it is sufficient to modify the respective sound paths by modifying the shape of the driver holder, which is a simple matter in that no design change of the housing is required. In addition, with these sound paths, each sound path is put into a sealed state by press-fitting the tubular portion into the holder insertion portion. Therefore, assembly while ensuring the hermeticity of the second sound path for the microphone is facilitated. Furthermore, since the second sound path is provided integrally with the driver holder, the positional relationship between the driver and the microphone is stabilized. Therefore, variations due to assembly can be suppressed.

A driver holder according to a second aspect is the configuration according to the first aspect, in which the driver holder is formed with an elastic material.

In the second aspect, since the driver holder is formed with an elastic material, the tubular portion can be easily press-fitted into the holder insertion portion by elastic deformation thereof, and the ease of assembly of the driver holder can be improved.

A driver holder according to a third aspect is the configuration according to the first aspect or the second aspect, in which a rib projecting from the surface is formed at the surface of the tubular portion, and the tubular portion is press-fitted into the holder insertion portion while elastically deforming the rib.

According to the third aspect, the tubular portion is press-fitted into the holder insertion portion while elastically deforming the rib. This reduces the frictional resistance when the tubular portion is press-fitted into the holder insertion portion, thereby improving the workability during manufacturing.

A driver holder according to a fourth aspect is the configuration according to any one of the first to third aspects, in which a driver pressing portion is provided at the tubular portion, the driver pressing portion protruding toward an inner side in a radial direction from an opening at another end side in the axial direction at which the driver is inserted, and the driver is accommodated inside the tubular portion by surmounting the driver pressing portion, and is pressed toward one side in the axial direction by elastic force of the driver pressing portion.

According to the fourth aspect, the driver is pressed toward one side in the axial direction of the tubular portion by the elastic force of the driver pressing portion. Therefore, the sealing performance between the driver and the tubular portion is effectively enhanced in the vicinity of the first sound path, which in turn contributes to improvement of the sealing performance of the first sound path. Further, in the manufacturing process, by surmounting the driver pressing portion, since the operator can clearly confirm that the driver is housed in an appropriate position in the tubular portion by visual and tactile sense, product assembly accuracy and workability are improved.

A driver holder according to a fifth aspect is the configuration according to any one of the first to fourth aspects, in which plural of the grooves are formed at the surface of the tubular portion.

According to the fifth aspect, plural grooves forming the second sound path are formed at the surface of the tubular portion. As a result, the impact absorption of the driver holder can be enhanced, as a result of which the impact resistance of the driver is improved. In addition, it is possible to form an optimum sound path for the microphone matching the acoustic characteristics while also reducing the outer diameter of the driver holder.

A driver holder according to a sixth aspect is the configuration according to any one of the first to fifth aspects, in which the holder insertion portion is configured by a bottomed tubular module case, and the tubular portion is press-fitted inside the module case.

According to the sixth aspect, since the holder insertion portion is configured by a bottomed tubular module case, by press-fitting the driver holder into the module case, the driver and sound path can be easily modularized.

A driver holder according to a seventh aspect is the configuration according to the sixth aspect, in which the module case has another end side in the axial direction closed off by a closing member, and a holder pressing portion is provided at another end side in the axial direction of the tubular portion, the holder pressing portion being disposed between the closing member and the tubular portion, and pressing the tubular portion toward the one end side in the axial direction.

According to the seventh aspect, a holder pressing portion is arranged between the closing member of the module case and the tubular portion, and presses the driver holder toward the one end side in the axial direction. Therefore, by putting the module case into a closed state, the tubular portion can be pressed toward the one end side in the axial direction, and therefore, it is possible to stabilize the positional relationship between the driver and the microphone and to reduce variations due to assembly.

A driver holder according to an eighth aspect is the configuration according to the seventh aspect, in which the holder pressing portion is provided with a microphone fixing portion, which fixes a microphone, at a face at an opposite side from a face that contacts the tubular portion.

In the driver holder according to the eighth aspect, the holder pressing portion is provided with a microphone fixing portion, and a microphone is disposed inside the module case. As a result, the main functional parts that configure the headset, such as the driver, microphone, and sound paths, are modularized, and product management is superior because the product can be managed as an assembly. Further, by assembling the main components in advance, the installation work on the housing side can be simplified. Furthermore, since the module case can be used in combination with housings for plural products having different shapes, versatility is excellent.

Since a driver module according to a ninth aspect includes the driver holder according to the first to eighth aspects, as described above, it is possible to easily change the sound path for the microphone and ensure sealing, and to improve the assembly efficiency.

Since a headset according to a tenth aspect includes the driver holder according to the first to eighth aspects, as described above, it is possible to easily change the sound path for the microphone and ensure sealing, and to improve the assembly efficiency.

Effect of the Invention

According to the present disclosure, a driver holder, a driver module, and a headset that facilitate modification of the sound path for a microphone and acquisition of sealing properties, and that exhibit improved ease of assembly, are provided.

BEST MODE FOR CARRYING OUT THE INVENTION

First Exemplary Embodiment

A headset 1 according to a first embodiment is described below with reference to FIGS. 1 to 4. In the present specification, for convenience of explanation, the eardrum side of the external auditory canal (ear canal) when the headset 1 is worn is referred to as the front side, and the entrance side or auricle side of the ear canal is referred to as the rear side.

Overall Configuration

Figure 1:
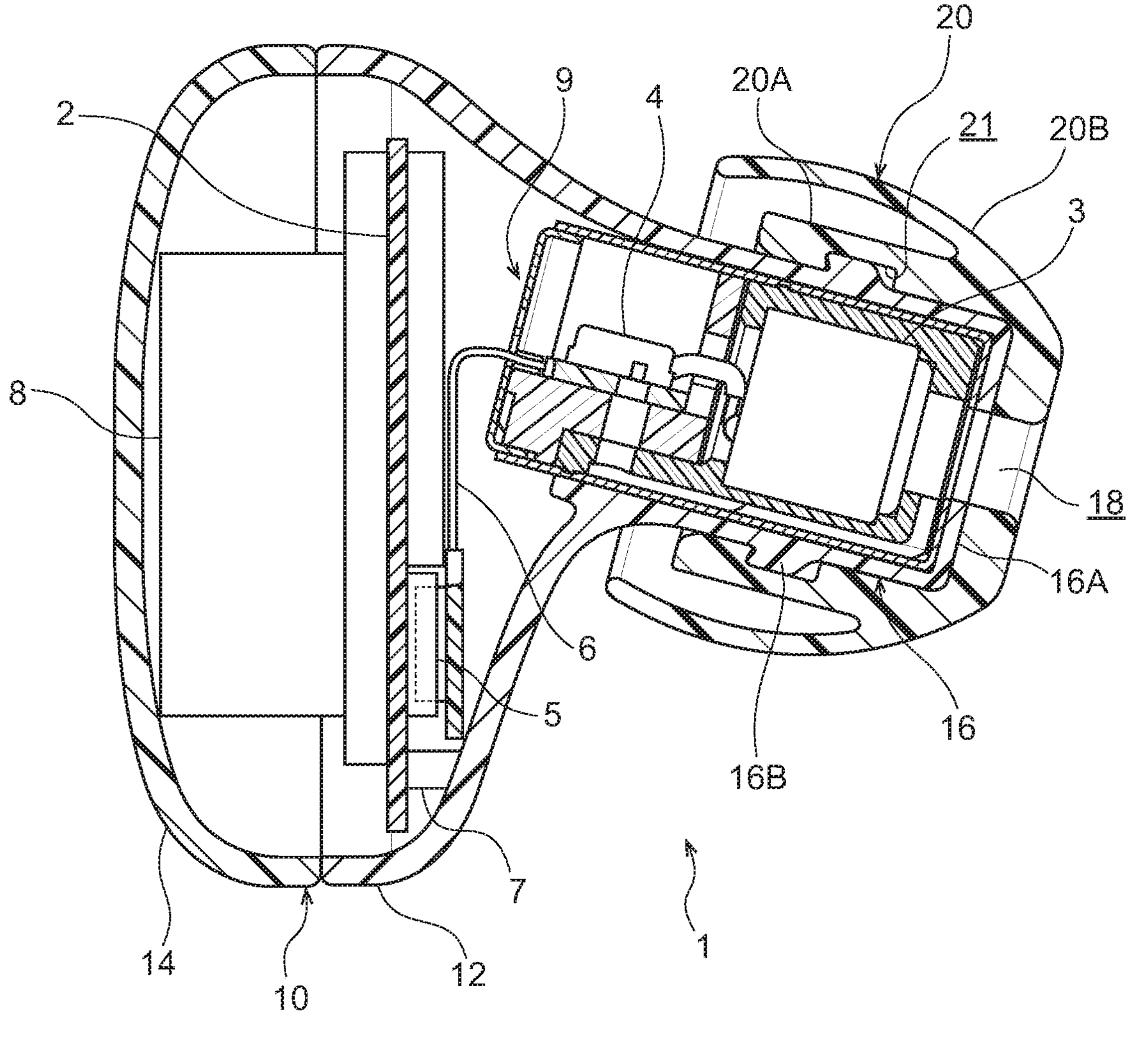
FIG. 1 is a cross-sectional view showing the overall configuration of a headset according to a first embodiment.

As shown in FIG. 1, the headset 1 has a hollow housing 10 accommodating functional components inside. The housing 10 is formed by fitting together a front housing 12 and a rear housing 14.

The front housing 12 is formed in a tubular shape having an outer shape of an oblique truncated cone as a whole, and gradually decreases in diameter from the rear side toward the front side. As a result, the front housing 12 has a shape protruding toward the eardrum side of the user.

An ear canal insertion portion 16 is provided at a front portion of the front housing 12 and protrudes from the top of the oblique truncated cone toward the eardrum side. The ear canal insertion portion 16 is formed in a bottomed tubular shape whose axial direction is the front-rear direction, and a housing opening 18 that communicates the inside and outside of the front housing 12 is provided in the center of a bottom surface 16A that configures a front end part. Inside the ear canal insertion portion 16, a driver module 9, which is described below, is accommodated.

An earpiece 20 is attached to the outer periphery of the ear canal insertion portion 16. The earpiece 20 is also called an eartip, an earpad, or an earcap, and consists of an elastic material such as silicone rubber. The earpiece 20 has a cylindrical portion 20A fitted around the outer circumference of the ear canal insertion portion 16. The cylindrical portion 20A is configured such that a fitting groove 21 provided on the inner periphery fits onto a fitting projection 16B provided on the outer periphery of the ear canal insertion portion 16. At the leading end of the cylindrical portion 20A, a hemispherical cover-like adhesion portion 20B is integrally provided so as to be deployed covering the entire cylindrical portion 20A. The adhesion portion 20B is configured to closely contact the wall surface of the user's ear canal and to block the ear canal when the headset 1 is in use.

The rear housing 14 is formed in a shallow dish shape that opens forward and is arranged so as to close off the rear opening of the front housing 12.

A printed circuit board 2 is arranged in a housing space defined by the rear portion of the front housing 12 and the rear housing 14. The printed board 2 is a board on which electronic components necessary for controlling the headset 1 are mounted. For example, various controls are performed according to the purpose of use of the headset 1, such as output control of, for example, output signals from a driver 3, which is described below, adjustment of, for example, the sensitivity of a microphone 4, and cancellation frequency bands and levels in noise canceling when performing personal authentication with the headset. The printed circuit board 2 is arranged in an orientation in which the board thickness direction is substantially in the front-rear direction, and has mounting surfaces on both the front and back surfaces. In the present embodiment, a flexible board 6 connected to a driver module 9 via a connector 5 and a charging terminal 7 of the headset 1 are connected to the front mounting surface of the printed board 2. Further, a battery 8 is arranged behind the printed circuit board 2.

Driver Module

Next, the configuration of the driver module 9 is described in detail with reference to FIGS. 2 to 4. The driver module 9, inside a module case 30 forming an outer shell, accommodates a driver holder 40, a driver 3, a microphone holder 60, and a microphone substrate 70 on which a microphone 4 is mounted, in this order from the front to the rear.

Figure 2:
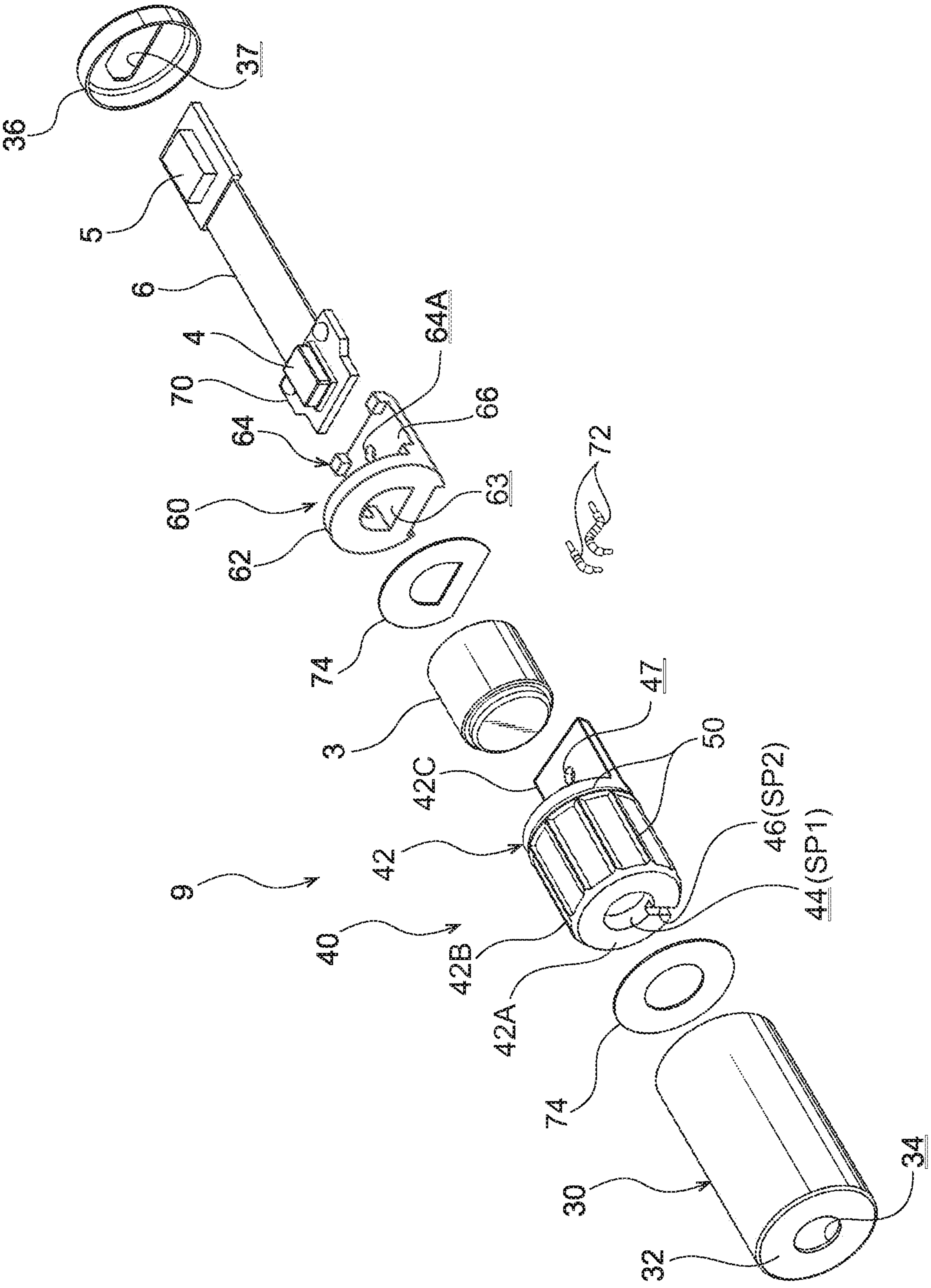
FIG. 2 is an exploded perspective view of a driver module according to the first embodiment.

As shown in FIG. 2, the module case 30 is formed in a bottomed tubular shape that is open rearward, and a module opening 34 that communicates the inside and outside of the module case 30 is provided in the center of the bottom wall 32 that configures a front end part. The module opening 34 has substantially the same external dimensions as the housing opening 18 and is coaxially arranged. The module case 30 is formed, for example, by drawing a metal material such as iron or aluminum with a press machine. Further, an opening on the rear end side (the other end side in the axial direction) of the module case 30 is closed off by a closing member 36 made of metal. The module case 30 corresponds to a "holder insertion portion" in the present disclosure, and a driver holder 40, which is described below, is inserted therein.

The driver holder 40 is formed in an elongated shape with the front-rear direction being its longitudinal direction. The driver holder 40 is configured by a tubular portion 42 formed in a tubular shape as a whole. In the present embodiment, the driver 3 is housed inside the tubular portion 42. This driver holder 40 is made of an elastic material that can be elastically deformed. In the present embodiment, the driver holder 40 is made of an elastomer material such as thermoplastic elastomer (TPE) or thermoplastic polyurethane (TPU). The driver holder 40 is press-fitted from the rear side in the axial direction of the module case 30, and is configured such that a surface portion thereof is in close contact with the inner surface of the module case 30.

The tubular portion 42 is formed in a tubular shape whose axial direction is the front-rear direction, and is open in the front-rear direction. The tubular portion 42 is press-fitted into the module case 30 and is in close contact with the inner surface of the module case 30, thereby forming a first sound path SP1 and a second sound path SP2.

Figure 3:
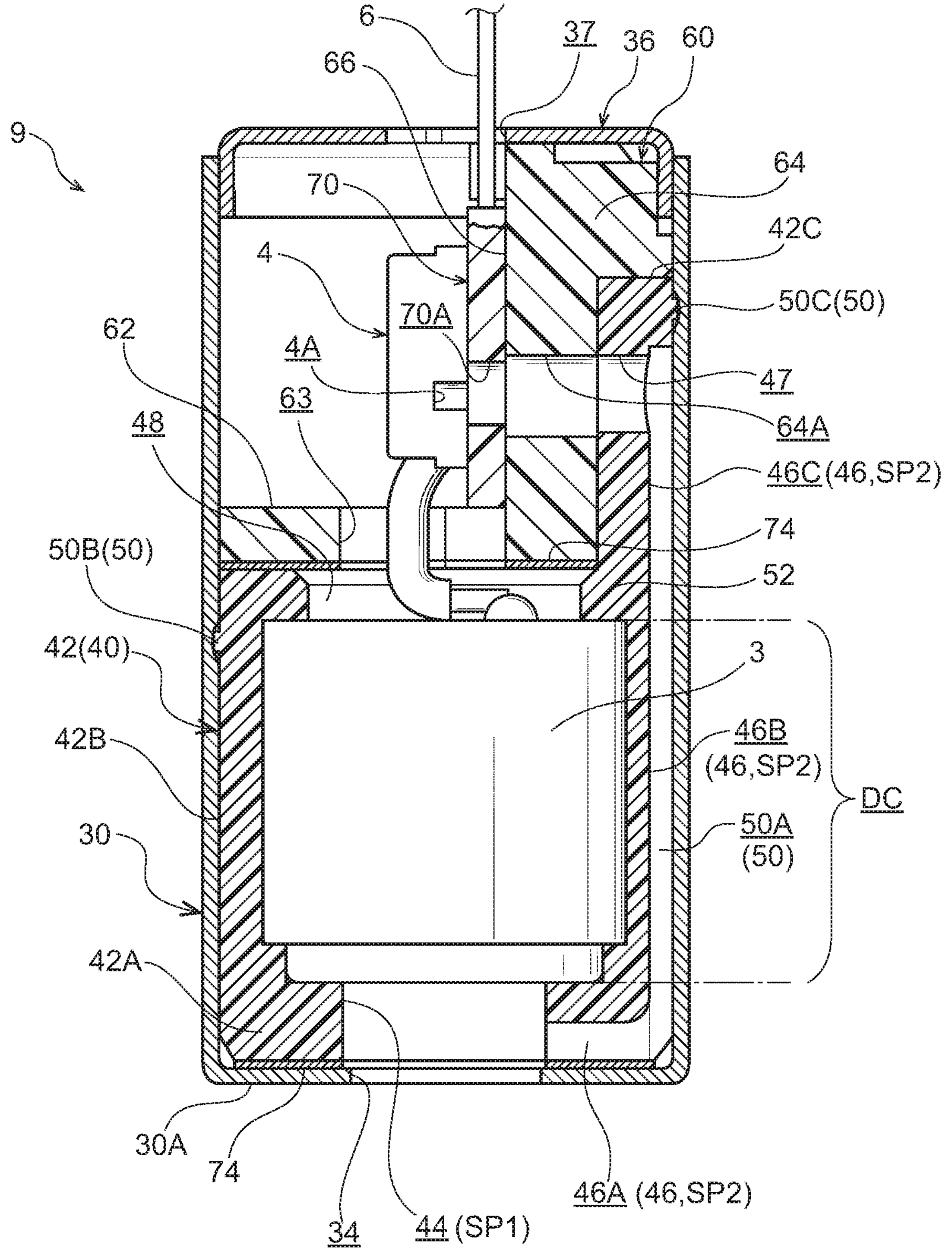
FIG. 3 is an axial direction longitudinal sectional view of the driver module according to the first embodiment.
Figure 4A:
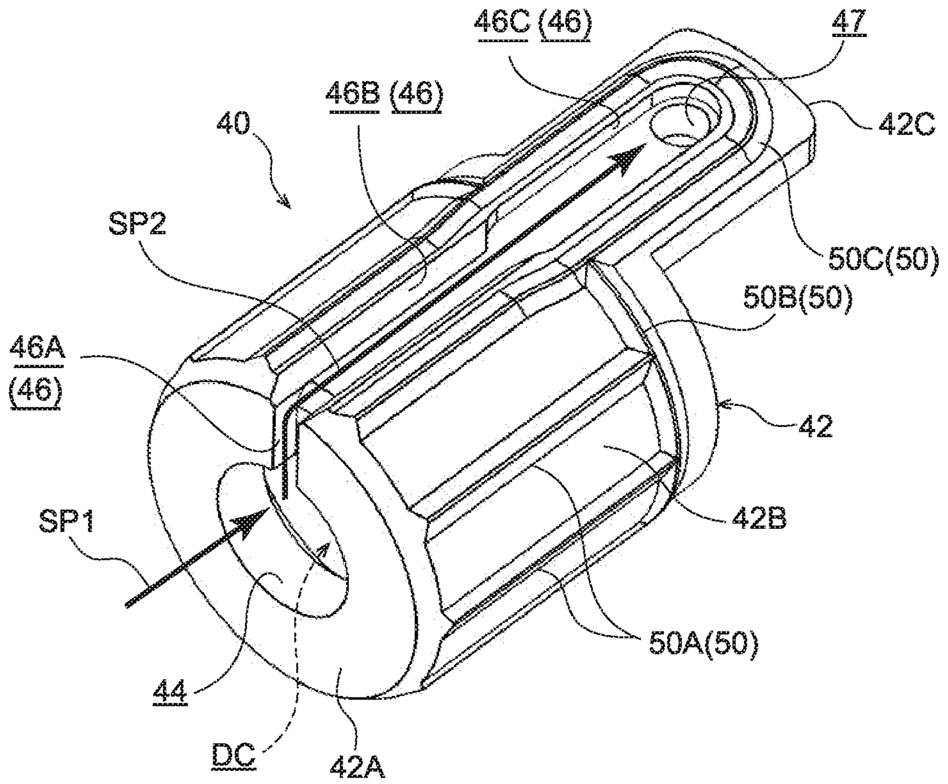
FIG. 4A is a perspective view of a driver holder according to the first embodiment.
Figure 4B:
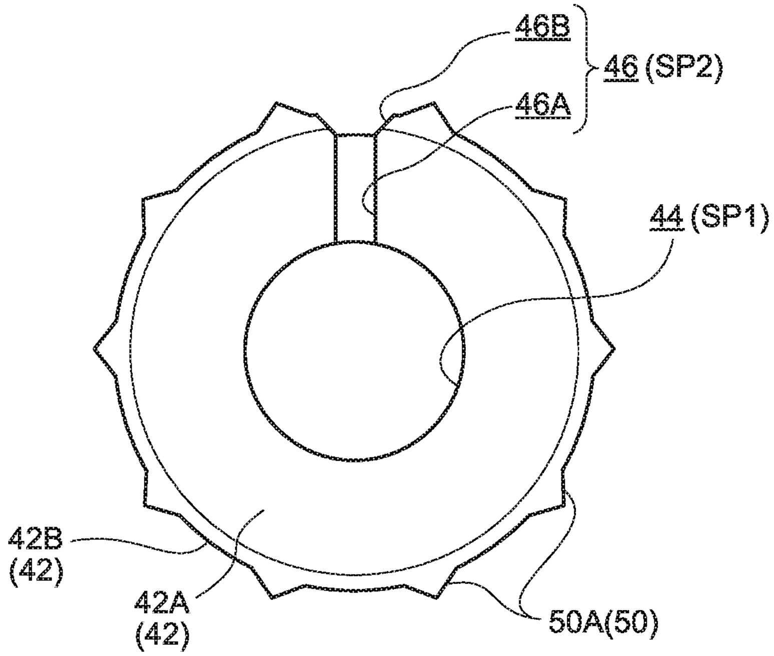
FIG. 4B is a diagram of the driver holder as viewed from the front side in the axial direction.

As shown in FIGS. 3 and 4, the first sound path SP1 is configured by an opening on the front end side (the one side) of the tubular portion 42 in the axial direction. More specifically, the first sound path SP1 is configured by a through hole 44 that extends through a front wall 42A, which covers the front end of the tubular portion 42, in the front-rear direction. This first sound path SP1, in a state in which the tubular portion 42 is press-fitted into the module case 30, forms a sound path that connects the driver 3 and the user's ear canal. Further, in the first sound path SP1, by adjusting the thickness dimension of the front wall 42A and the inner diameter dimension of the through hole 44, the volume of the first sound path SP1, and thus the volume in front of the driver, 3 can be adjusted.

The second sound path SP2 is configured by a groove portion 46 formed at a surface of the tubular portion 42. The second sound path SP2 is communicated with the first sound path SP1 in a state in which the tubular portion 42 is press-fitted into the module case 30, and in addition, forms a sound path extending to the microphone 4, described below, in the module case 30. The groove portion 46 includes a side groove portion 46A formed in the front wall 42A of the tubular portion 42, a first longitudinal groove portion 46B formed in an outer peripheral portion 42B, and a second longitudinal groove portion 46C formed in an extension portion 42C, described below, of the tubular portion 42. The side groove portion 46A extends along the radial direction of the tubular portion 42 from a peripheral edge of the through hole 44 formed in the front wall 42A, and is communicated with the first sound path SP1. The first longitudinal groove portion 46B is provided continuously with the side groove portion 46A at a radially outer end portion of the tubular portion 42, and extends along the axial direction of the tubular portion 42. The second longitudinal groove portion 46C of the extension portion 42C is provided continuously from a rear end portion of the first longitudinal groove portion 46B.

The extension portion 42C is provided at an end portion on a rear end side (the other end side) in the axial direction of the outer peripheral portion 42B. The extension portion 42C is a plate-like member that extends axially rearward from an opening portion 48 provided at the rear end portion of the outer peripheral portion 42B, and has the radial direction of the tubular portion 42 as its thickness direction. The extension portion 42C has a curved surface that is continuous with the outer peripheral portion 42B on the radial direction outer side, and closely contacts the inner surface of the module case 30. The second longitudinal groove portion 46C is formed continuously with the first longitudinal groove portion 46B at the radial direction outer side of the extension portion 42C. The second longitudinal groove portion 46C is communicated with a lateral through hole 47 passing through the extension portion 42C in the thickness direction. This second longitudinal groove portion 46C, via the lateral through hole 47, is communicated with a sound hole 4A of the microphone 4 via through holes 64A and 70A formed in a microphone holder 60 and a microphone substrate 70, which are described below.

Ribs 50 (50A, 50B, 50C) projecting toward the side of the module case 30 are integrally provided at the surface of the tubular portion 42. The ribs 50 are, for example, configured by triangular ribs, and in a state in which the tubular portion 42 is press-fitted into the module case 30, the tips of the triangular ribs are elastically deformed and closely contact the inner surface of the module case 30. That is, the ribs 50 have the function of reducing the contact area between the surface of the tubular portion 42 and the inner surface of the module case 30 and reducing frictional resistance during press fitting. Further, at the same time, they have a function of ensuring the sealing properties of the first sound path SP1 and the second sound path SP2.

Plural ribs 50A are arranged on the outer peripheral portion 42B of the tubular portion 42. The plural ribs 50A respectively extend along the axial direction of the tubular portion 42 and are arranged at a predetermined interval in the circumferential direction of the outer peripheral portion 42B. Further, a pair of ribs 50A is arranged on both sides of the first sound path SP1. While the plural ribs 50A are portions that are elastically deformed at the initial stage of press-fitting into the module case 30, since they extend along the insertion direction of the tubular portion 42, frictional resistance between the module case 30 and the tubular portion 42 is effectively reduced. Further, the ribs 50A closely contact the inner surface of the module case 30 on both sides of the first longitudinal groove portion 46B and seal the second sound path SP2. The rib 50B extends along the circumferential direction of the outer peripheral portion 42B and connects the upper ends of the ribs 50A. The rib 50B causes the outer peripheral portion 42B to closely contact the inner surface of the module case 30 along the circumferential direction. In addition, the rib 50C is arranged at the radial direction outer side of the extension portion 42C, extends so as to surround the periphery of the second longitudinal groove portion 46C, and closely contacts the inner surface of the module case 30 at the peripheral edge portion of the second longitudinal groove portion 46C.

Further, a driver pressing portion 52 is integrally provided on the rear end side (the other end side) of the tubular portion 42 in the axial direction. The driver pressing portion 52 forms a peripheral edge portion of the opening 48 and protrudes radially inward from the outer peripheral portion 42B in an eave-like shape. In the present embodiment, a driver accommodation portion DC is provided between the front wall 42A of the tubular portion 42 and the driver pressing portion 52. The driver 3 is accommodated in the driver accommodation portion DC by surmounting the driver pressing portion 52 while elastically deforming the driver pressing portion 52 forward. In a state in which the driver 3 is thus accommodated, the inner surface of the driver accommodation portion DC closely contacts the driver 3. The inner diameter (the diameter of the inner peripheral surface) of the driver accommodation portion DC is formed to be slightly smaller than the outer diameter of the outer peripheral surface of the driver 3. Accordingly, when the driver 3 is accommodated inside the driver accommodation portion DC, the outer peripheral surface of the driver 3 and the inner peripheral surface of the driver accommodation portion DC are brought into close contact and hermetically sealed. Further, the driver pressing portion 52 presses the driver 3 forward from the rear side in the axial direction by elastic restoring force, and the front surface of the driver 3 is brought into close contact with the periphery of the first sound path SP1.

The driver 3 includes a magnetic circuit for generating an output signal, a diaphragm, and the like in a cylindrical case whose axial direction is the front-rear direction, and a well-known structure can be used as appropriate. A diaphragm of the driver 3 is arranged at the front end side of the case, and outputs an acoustic signal into the user's ear canal via the first sound path SP1.

A microphone holder 60, serving as a holder pressing portion, is arranged behind the driver holder 40. The microphone holder 60 is configured as a plate-shaped member that is bent into a substantial L-shape as a whole, and is arranged between the tubular portion 42 of the driver holder 40 and the closing member 36 in a state in which the module case 30 is closed. The microphone holder 60 is made of a resin material, for example.

The microphone holder 60 has a lower wall portion 62 that abuts on the rear surface of the driver holder 40 and a lengthwise wall portion 64 that stands axially rearward from the upper surface of the lower wall portion 62. The lower wall portion 62 abutting on the rear surface of the driver holder 40 is provided with an opening 63 that passes through the lower wall portion 62 in the axial direction (plate thickness direction) and communicates the inside of the driver accommodation portion DC with the outside thereof. This opening 63 is provided in order to release rearward pressure, generated when the diaphragm of the driver 3 vibrates, to the space rearward of the driver 3. The opening 63 also serves as a wiring opening through which wiring 72 connected to the driver 3 is inserted, as is described below. Further, the lengthwise wall portion 64 abuts on a radially inner side of the extension portion 42C of the driver holder 40. In a state in which the module case 30 is closed, the rear end of the lengthwise wall portion 64 of the microphone holder 60 is pressed by the closing member 36. As a result, the lower wall portion 62 and the lengthwise wall portion 64 are configured to press the tubular portion 42 toward the front end side in the axial direction.

A microphone fixing portion 66 is provided at the lengthwise wall portion 64 of the microphone holder 60 at an opposite surface from the surface abutting on the extension portion 42C. A microphone substrate 70 is fixed to the microphone fixing portion 66 by a method such as fixing with a pressure-sensitive adhesive or clasp fitting. The microphone substrate 70 is arranged in a lengthwise orientation with the direction orthogonal to the axial direction of the module case 30 as the plate thickness direction, and a microphone 4 is mounted on a mounting surface facing an inner surface of the module case 30. Wiring 72 extending from the rear of the driver 3 is connected to the microphone substrate 70. The wiring 72 is connected to the microphone substrate 70 through the opening 63 formed in the lower wall portion 62 of the microphone holder 60. Here, the microphone substrate 70 is not essential in the present disclosure, and the configuration may be such that the microphone is directly fixed to the microphone fixing portion 66.

The microphone 4 is suitable for the functions of the headset 1, such as noise canceling, personal authentication, and pulse wave detection. For example, the microphone 4 is used as a microphone that collects sound in the ear canal, such as a feedback microphone for noise cancellation, or as a vibration sensor that measures vibrations in audible and non-audible frequency bands, pressure changes, or the like in the ear canal.

By mounting the microphone 4 on the lengthwise microphone substrate 70, a sound hole 4A for sound collection provided in correspondence with the inner diaphragm is opened in a direction orthogonal to the axial direction of the module case 30. The sound hole 4A, by means of through holes 64A and 70A formed in the lengthwise wall portion 64 of the microphone holder 60 and the microphone substrate 70, is communicated with the lateral through hole 47 provided in the extension portion 42C of the driver holder 40. As a result, sound (vibration) in the ear canal reaches the microphone 4 via the second sound path SP2.

The microphone 4 is arranged inside the module case 30 both in front of and behind the tubular portion 42 of the driver holder 40 along the axial direction. By arranging the driver holder 40 and the microphone 4 lengthwise in this way, the module case 30 can be made radially compact, and the entire module case 30 can be placed in the ear canal.

In the present embodiment, the microphone substrate 70 and the printed circuit board 2 described above are connected by a flexible board 6. The flexible board 6 is formed in an elongated sheet shape, and is connected to the rear end of the microphone substrate 70 as shown in FIG. 3. The other end of the flexible substrate 6 is inserted through the insertion portion 37 of the closing member 36 and protrudes outside the module case 30. The flexible substrate 6 is accommodated in a rear accommodation space of the housing 10 in a bent state (see FIG. 1).

The driver module 9 having the above-described configuration is assembled as follows. After housing the driver 3 in the driver holder 40, the microphone holder 60, the microphone substrate 70, the microphone 4, and the flexible substrate 6, which are pre-assembled in the driver holder 40, are further affixed. Then, the driver 3 and the microphone substrate 70 are connected by the wiring 72. After this, these are integrally press-fitted inside the module case 30, and by closing the rear end opening of the module case 30 with the closing member 36, assembly of the driver module 9 is completed.

In the present embodiment, a sheet-like pressure-sensitive adhesive 74 is provided between the module case 30 and the driver holder 40 and between the driver holder 40 and the microphone holder 60 to join these together. The pressure-sensitive adhesive 74 is provided in order to stabilize the positioning of the respective parts at the time of module assembly; however, from the viewpoint of ensuring airtightness inside the module case 30, it is not essential. That is, in the present embodiment, elastic force of the driver holder 40 can be used to ensure airtightness within the module case 30. Therefore, from the viewpoint of reducing the number of parts, a configuration in which the pressure-sensitive adhesive 74 is not provided in the module case 30 may be adopted.

Mechanism and Effects

The headset 1 according to the present embodiment has been explained above; however, in a case in which the headset 1 has a noise canceling function, noise or the like that enters into the ear canal from the outside reaches the microphone 4 through the first sound path SP1 and the second sound path SP2 formed in the module case 30. Noise reaching the microphone 4 is converted into an electrical signal by the microphone 4. An electrical signal corresponding to the converted noise is input to the control unit of the printed circuit board 2, and a noise canceling signal of opposite phase is generated. Noise canceling is enabled by converting this noise cancellation signal into an acoustic signal and outputting it from the driver 3.

Moreover, in a case in which the headset 1 has a biometric verification function, using, for example, individual differences in the shape of the ear canal of an individual, an acoustic signal is output from the driver 3 and a response signal generated in the ear canal is acquired by the microphone 4. By performing frequency analysis of the response signal acquired by the microphone 4 in the control unit, the individual can be verified.

In addition, in the present embodiment, the driver holder 40 has a tubular portion 42 formed of an elastic material in a tubular shape, and the driver 3 is accommodated inside the tubular portion 42. Further, the tubular portion 42 is configured to be press-fitted into a holder insertion portion; that is, into the module case 30 inside the housing 10. As a result, the driver 3 arranged inside the housing 10 is held by the driver holder 40.

Here, the through-hole 44 provided at the front end side (one end side) of the tubular portion 42 in the axial direction configures a first sound path SP1 that communicates the driver 3 with the user's external auditory canal. As a result, an acoustic signal output by the driver 3 is radiated to the user's ear canal (outside the housing 10) via the first sound path SP1.

A second sound path SP2 is formed at the surface of the tubular portion 42. This second sound path SP2 is configured by a groove portion 46 formed at a surface of the tubular portion 42, is communicated with the first sound path SP1, and extends to the microphone 4 arranged at an outer side (rear side) of the tubular portion 42. As a result, the acoustic signal in the user's ear canal propagates to the microphone 4 via the first sound path SP1 and the second sound path SP2.

According to the configuration described above, modification of the respective sound path portions is facilitated since it suffices to change the shape of the driver holder 40 and design modification of the housing 10 is unnecessary. Further, these sound path portions (SP1, SP2) are rendered into a sealed state by press-fitting the tubular portion 42 into the module case 30. Therefore, assembly while ensuring the hermeticity of the second sound path SP2 for the microphone is facilitated. Furthermore, since the second sound path SP2 is provided integrally with the driver holder 40, the positional relationship between the driver 3 and the microphone 4 is stabilized. Therefore, variations due to assembly can be suppressed.

Further, in the present embodiment, since a configuration is adopted in which the driver holder 40 is formed of an elastic material, the tubular portion 42 can be easily press-fitted into the module case 30 by elastic deformation thereof, and ease of assembly can be enhanced. Further, since the driver 3 is accommodated in the driver holder 40, impact absorption performance is enhanced.

In addition, in the present embodiment, ribs 50A, 50B, and 50C are formed on the surface of the tubular portion 42 and protrude from the surface, and the tubular portion 42 is press-fitted into the module case 30 while elastically deforming the ribs 50A, 50B, 50C. This reduces the frictional resistance when the tubular portion 42 is press-fitted into the module case 30, thereby improving the workability during manufacturing.

Further, in the present embodiment, the driver 3 is pressed toward the axial direction front side (the one side) of the tubular portion 42 by the elastic force of the driver pressing portion 52. As a result, the airtightness between the driver 3 and the tubular portion 42 is effectively enhanced in the vicinity of the first sound path SP1 which, in turn, contributes to an improvement in the sealing properties of the first sound path SP1. Further, in the manufacturing process, by surmounting the driver pressing portion 52, since the operator can clearly confirm that the driver 3 is housed in an appropriate position in the tubular portion 42 by visual and tactile sense, product assembly accuracy and workability are improved.

Further, in the present embodiment, since the module case 30 having a bottomed tubular shape configures the holder insertion portion, by press-fitting the driver holder 40 into the module case 30, the driver 3, the first sound path SP1 and the second sound path SP2 can be easily modularized.

Further, in the present embodiment, a microphone holder 60, as a holder pressing portion, is arranged between the closing member 36 and the tubular portion 42 of the module case 30, and presses the driver holder 40 toward the front end side (the one end side) in the axial direction. Therefore, by closing the module case 30, the tubular portion 42 can be pressed toward the front end in the axial direction, and therefore, it is possible to stabilize the positional relationship between the driver 3 and the microphone 4 and reduce variations due to assembly.

Further, in the present embodiment, since the microphone holder 60, as the holder pressing portion, is provided with the microphone fixing portion 66, a microphone 4 is arranged inside the module case 30. As a result, the main functional units of the headset 1—namely, the driver 3, the microphone 4, and the sound path—can be modularized and managed as an assembly, and therefore, product controllability is excellent. Further, by assembling the main components in advance, the installation work on the housing 10 side can be simplified. For example, in the present embodiment, the module case 30 (driver module 9) can be installed in the housing 10 simply by bonding the bottom wall 32 of the module case 30 to the bottom surface 16A of the ear canal insertion portion 16 using the pressure sensitive adhesive 74. Furthermore, by modularizing the driver 3 and the microphone 4 with the module case 30, plural products with different shapes and the like can be used together, and versatility is excellent.

Furthermore, in the present embodiment, by arranging the microphone 4 and the microphone substrate 70 with a longitudinal orientation, the microphone 4 can be arranged along the axial direction relative to the tubular portion 42. As a result, the outer dimensions of the module case 30 can be designed in accordance with the outer shape of the driver 3 (driver holder 40), and the size of the driver module 9 is reduced in the radial direction.

In other words, in a case in which a microphone is housed with a transverse orientation inside a module case, the microphone substrate on which the microphone is mounted also has a transverse orientation (an orientation in which the axial direction is the plate thickness direction). For this reason, compared to the configuration in which the microphone is disposed longitudinally, the module case is enlarged in the radial direction in order to secure the width of the microphone substrate. In this regard, in the present embodiment, by arranging the microphone with a longitudinal orientation, it is possible to effectively suppress the module case 30 from increasing in size in the radial direction.

Further, from the viewpoint of miniaturization of the module case 30, by making the module case 30 from metal, compared to a case in which it is formed from other materials such as resin, the thickness of the side wall and bottom wall of the case can be reduced, contributing to miniaturization.

Further, in the present embodiment, since the driver module 9 is arranged inside the ear canal insertion portion 16 of the housing 10, the accommodation space for other components inside the housing 10 can be expanded. As a result, by expanding the storage space for the battery, for example, the size of the battery can be increased, and it becomes possible to increase the battery capacity of the headset 1.

Furthermore, according to the present embodiment, since the microphone 4 is arranged behind the driver 3, the microphone 4 does not interfere with the acoustic output of the driver 3, and this eliminates the drawback that the desired acoustic characteristics cannot be obtained.

Further, since the driver module 9 is arranged inside the ear canal insertion portion 16, the volume in front of the driver 3 can be reduced. Here, the volume in front of the driver is the volume of the front chamber of the driver formed between the driver and the ear canal inside the housing. That is, in the present embodiment, since the volume in front of the driver can be reduced, attenuation of high-frequency characteristics in the ear canal can be suppressed.

Second Exemplary Embodiment

Figure 5A:
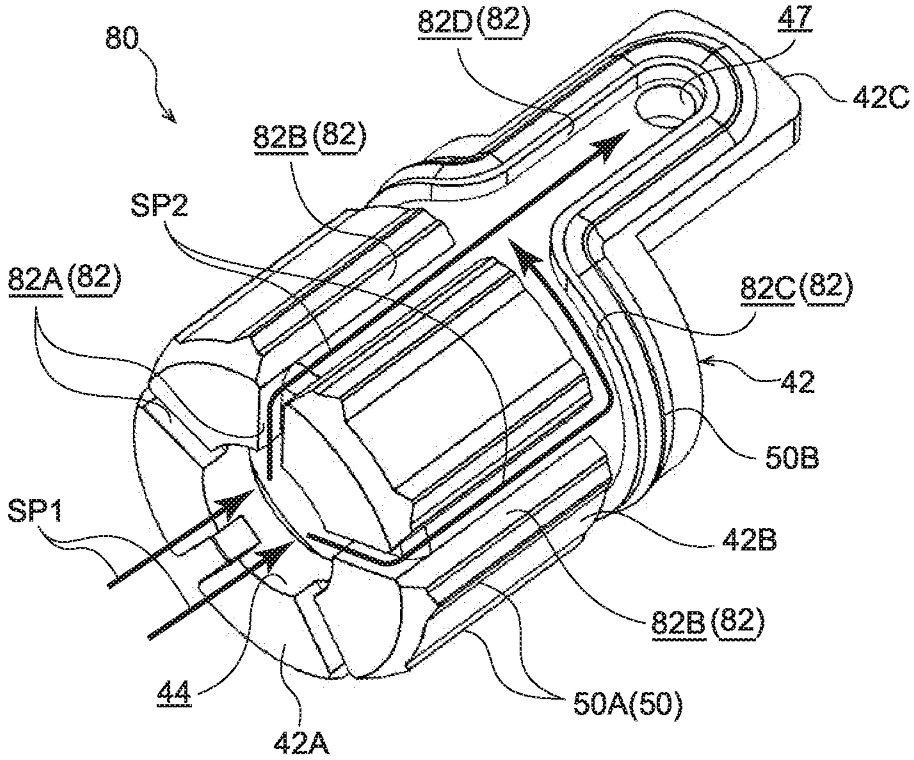
FIG. 5A is a perspective view of a driver holder according to a second embodiment.
Figure 5B:
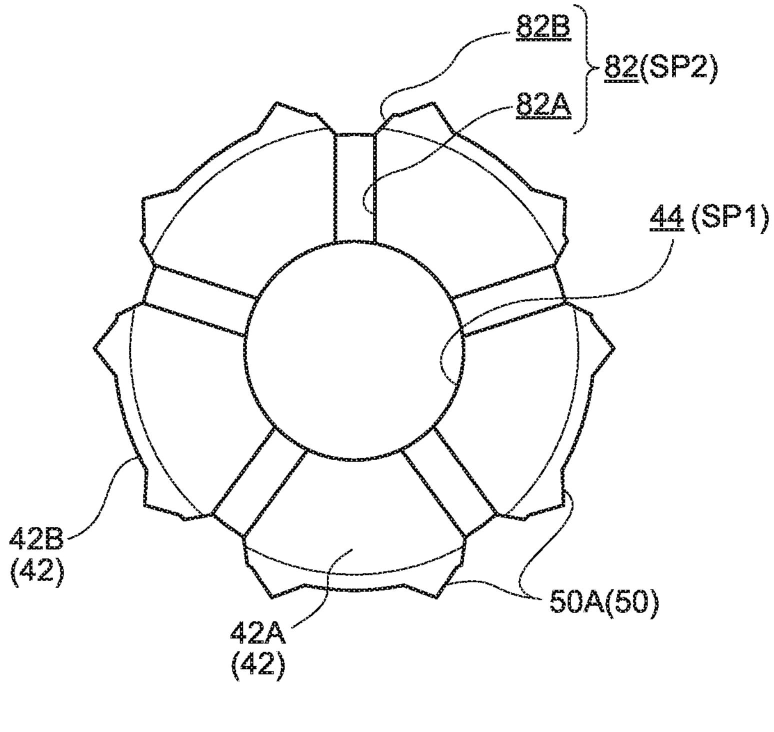
FIG. 5B is a diagram of the driver holder as viewed from the front side in the axial direction.

The driver holder 40 according to the first embodiment described above has the second sound path SP2 formed in the overall shape of a single groove on the surface of the tubular portion 42. In contrast, as shown in FIGS. 5A-5B, the driver holder 80 according to the second embodiment is characterized in that plural groove portions 82 formed on the surface of the tubular portion 42 and communicating with each other configure the second sound path SP2. The remaining configuration is the same as in the first embodiment. Here, in the present embodiment, components that are the same as those in the first exemplary embodiment described above are appended with the same reference numerals, and explanation thereof is omitted.

The plural groove portions 82 configuring the second sound path SP2 have five side groove portions 82A formed in the front wall 42A of the tubular portion 42, and five first longitudinal groove portions 82B formed in the outer peripheral portion 42B of the tubular portion 42 and provided continuously with the side groove portions 82A. These side groove portions 82A and first longitudinal groove portions 82B have configurations corresponding to the side groove portion 46A and first longitudinal groove portion 46B in the first embodiment described above. Each of the five side groove portions 82A extends radially outward from the periphery of the through hole 44 formed in the center of the front wall 42A, and as viewed from the axial direction, they are arranged radially as a whole. In addition, the five first longitudinal groove portions 82B are formed continuously with the radial outer end part of each side groove portion 82A, and extend along the axial direction on the surface of the outer peripheral portion 42B. In other words, the five first longitudinal groove portions 82B are arranged at predetermined intervals along the circumferential direction of the outer peripheral portion 42B.

A circumferential groove portion 82C extending along the circumferential direction on the surface of the outer peripheral portion 42B is formed behind the five first longitudinal groove portions 82B. The circumferential groove portion 82C connects the rear end portions of the five first longitudinal groove portions 82B in the circumferential direction and is communicated with each of the first longitudinal groove portions 82B. Furthermore, one second longitudinal groove portion 82D is formed behind the circumferential groove portion 82C. The second longitudinal groove portion 82D is formed on the surface of the extension portion 42C of the tubular portion 42. The second longitudinal groove portion 82D extends axially rearward from the circumferential groove portion 82C and is communicated with the lateral through hole 47 of the extension portion 42C. The second longitudinal groove portion 82D has a structure corresponding to the second longitudinal groove portion 46C in the first embodiment described above.

In the configuration of the second sound path SP2, sound in the user's ear canal passes through the first sound path SP1, the side groove portion 82A, the first longitudinal groove portion 82B, the circumferential groove portion 82C, and the second longitudinal groove portion 82D in this order and reaches the sound hole 4A of the microphone 4.

Since the driver holder 80 having the above-described configuration essentially conforms to the configuration of the driver holder 40 according to the first embodiment, it is possible to obtain the same mechanism and effects. Further, in the present embodiment, since plural groove portions 82 (82A, 82B, 82C, 82D) are formed on the surface of the tubular portion 42 to form the second sound path SP2, these groove portions 82 enhance the impact absorption performance of the tubular portion 42. As a result, the impact resistance of the driver 3 is improved.

Further, according to the present embodiment, the cross-sectional area of the second sound path SP2 can be easily modified, and the acoustic signal of the microphone can be adjusted to desired high frequency characteristics. That is, in the second embodiment, the front wall 42A and the outer peripheral portion 42B of the tubular portion 42 are formed with five lateral groove portions 82A and five first longitudinal groove portions 82B, respectively. However, the present disclosure is not limited to this, and the cross-sectional area of the second sound path SP2 can be modified by changing the number and the cross-sectional area of each of the lateral groove portions 82A and the first longitudinal groove portions 82B as required. It is sufficient that the number of lateral groove portions 82A and first longitudinal groove portions 82B is one or more, and the number can be increased or decreased as appropriate. Further, if the cross-sectional area of the second sound path SP2 is changed, since the characteristics of the acoustic signal acquired at the position of the microphone 4 via the second sound path SP2 change, the acoustic signal of the microphone 4 can be adjusted to desired high frequency characteristics.

Figure 6:
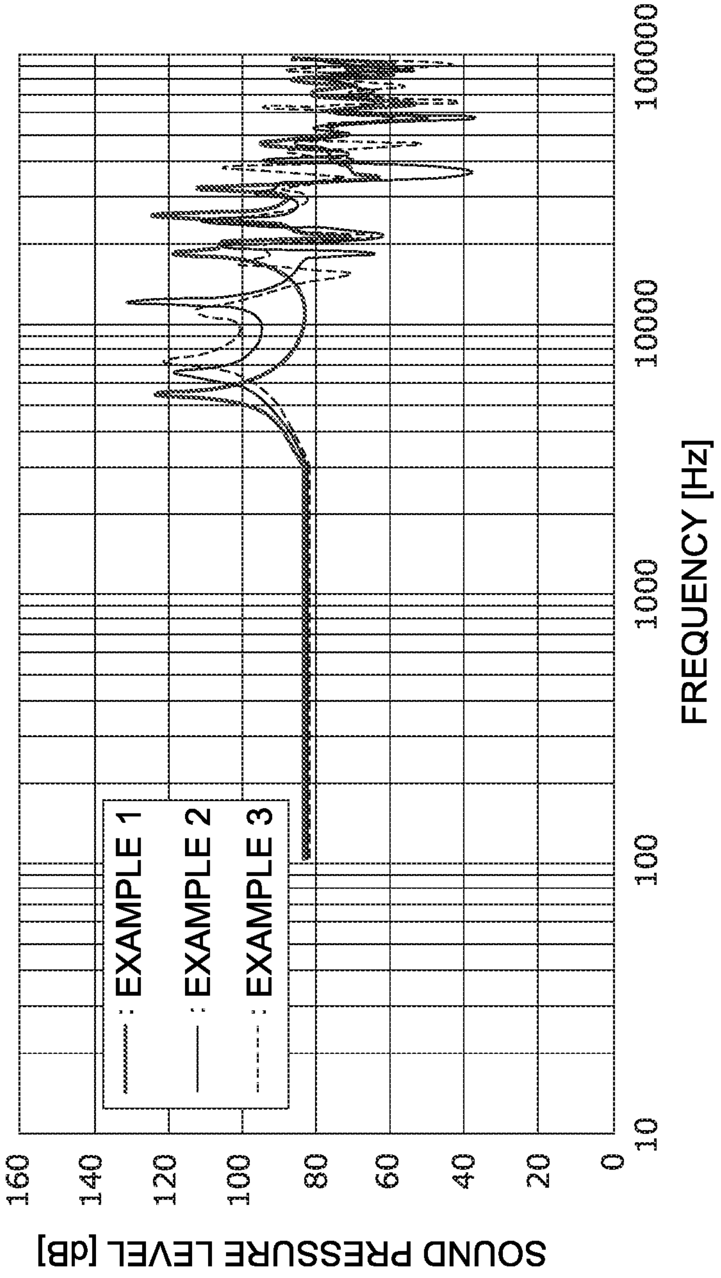
FIG. 6 is a graph relatively showing frequency characteristics of the driver at the microphone position in accordance with variations of the second sound path.

Here, with reference to FIG. 6, the manner in which the frequency characteristics of the acoustic signal output from the driver 3 at the position of the microphone 4 change in accordance with a change in the second sound path SP2 is described. In each example, in a case in which an acoustic signal was output from the driver 3 in a state in which the user was wearing a headset corresponding to the respective example, the sound pressure level acquired at the position of the microphone 4 was confirmed by simulation. FIG. 6 shows the relative frequency characteristics (relative difference) of the driver sound sources at the position of the microphone 4 in Examples 2 and 3, with Example 1 as a reference. In the graph of FIG. 6, the horizontal axis indicates the frequency [Hz] of the acoustic signal output from the driver 3, and the vertical axis indicates the sound pressure level [dB] at the position of the microphone 4.

Example 1

In the headset of Example 1, one lateral groove portion 46A, one first longitudinal groove portion 46B, and one second longitudinal groove portion 46C were formed on the surface of the tubular portion of the driver holder. That is, in Example 1, the second sound path SP2 is formed in the same configuration as in the driver holder 40 of the first embodiment (see FIGS. 4A-4B).

Example 2

In the headset of Example 2, on the surface of the tubular portion of the driver holder, five lateral groove portions 82A, five first longitudinal groove portions 82B, one circumferential groove portion 82C and one second longitudinal groove portion 82D are formed. That is, in Example 2, the second sound path SP2 is formed in the same configuration as in the driver holder 80 of the second embodiment (see FIGS. 5A-5B).

Example 3

In the headset of Example 3, on the surface of the tubular portion of the driver holder, ten lateral groove portions 82A, ten first longitudinal groove portions 82B, one circumferential groove portion 82C and one second longitudinal groove portion 82D are formed. That is, in Example 3, while the basic structure is the same as in the driver holder 80 of the second embodiment, ten lateral groove portions 82A and ten first longitudinal groove portions 82B formed in the front wall 42A and the outer peripheral portion 42B of the tubular portion 42 are arranged at equal intervals along the circumferential direction to form the second sound path SP2.

As shown in FIG. 6, by changing the shape of the second sound path portion formed in the driver holder, the frequency characteristics at the position of the microphone 4 can be adjusted in the high frequency range. As a result, according to the second embodiment described above, the acoustic signal of the microphone can be adjusted to desired high-frequency characteristics.

Further, by providing plural groove portions 82 on the surface of the tubular portion 42 as in the second embodiment described above, the cross-sectional area of the second sound path SP2 can be easily secured. Accordingly, as such, by reducing the height dimension (the dimension in the radial direction) of a single groove portion 82, the outer diameter dimension of the tubular portion 42 can be set even smaller, and the size of the module case 30 can be reduced in the radial direction.

Third Exemplary Embodiment

Figure 7:
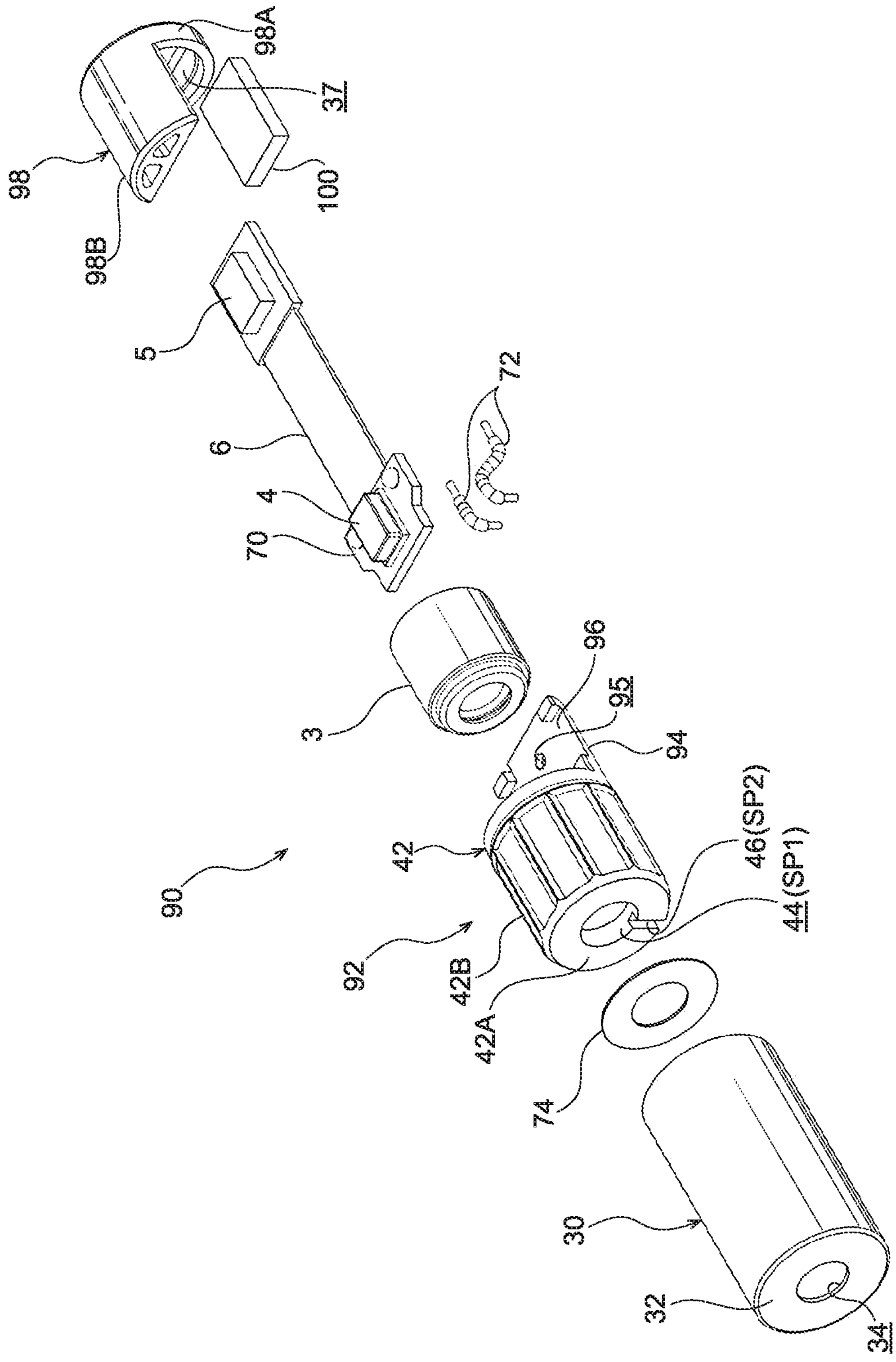
FIG. 7 is an exploded perspective view of a driver module according to a third embodiment.
Figure 8:
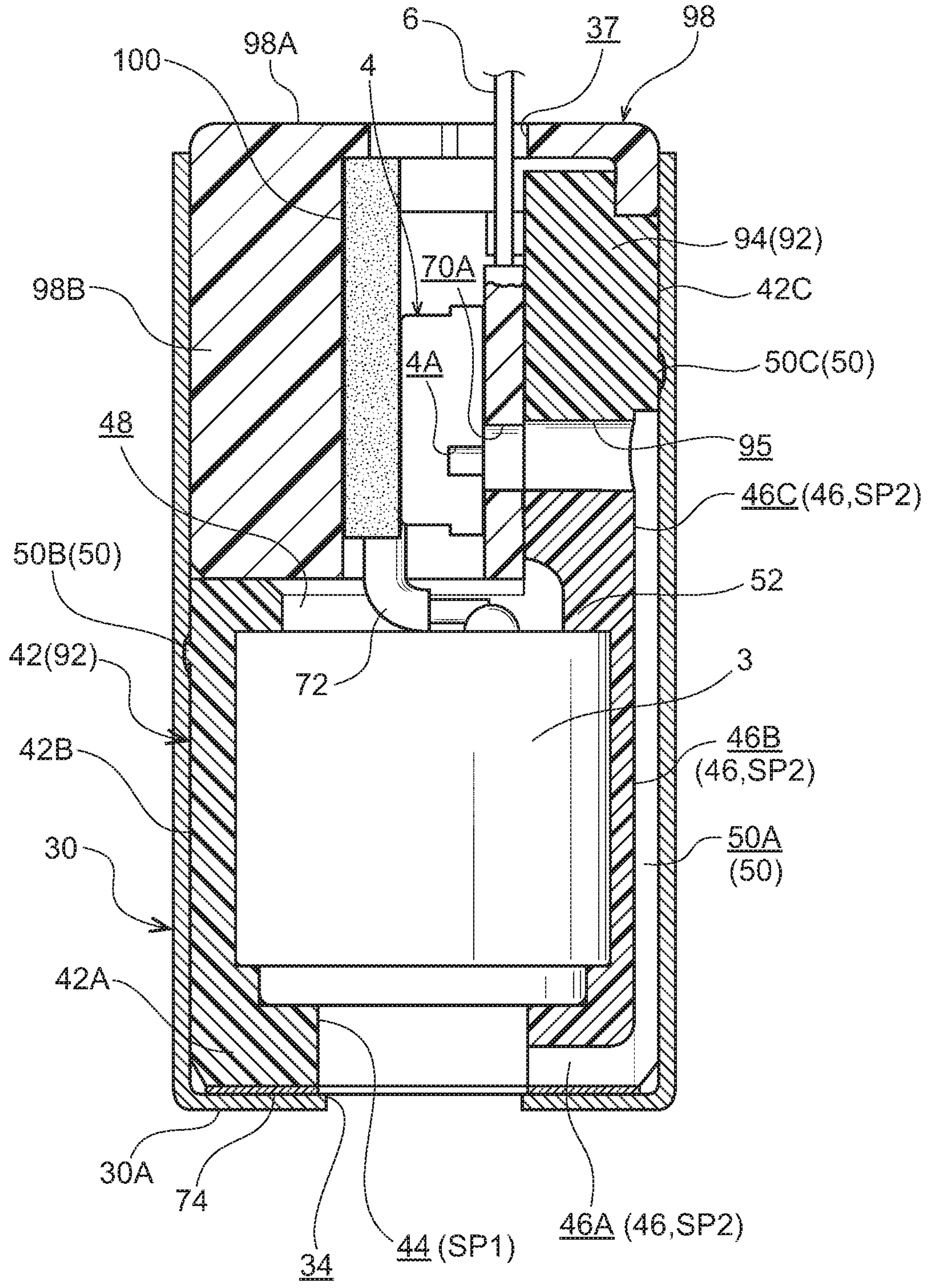
FIG. 8 is an axial direction longitudinal sectional view of the driver module according to the third embodiment.

In a third embodiment, as shown in FIGS. 7 and 8, a microphone fixing portion 96 is provided integrally with an extension portion 94 of a driver holder 92. That is, a characteristic feature is that a configuration corresponding to the driver holder 40 and the microphone fixing portion 66 of the microphone holder 60 in the first embodiment is integrally formed. Further, a characteristic feature is that a closing member 98 is provided with a holder pressing portion 98B. The remaining configuration is the same as in the first embodiment. Here, in the present embodiment, components that are the same as those in the first exemplary embodiment described above are appended with the same reference numerals, and explanation thereof is omitted.

In the present embodiment, inside the module case 30 forming the outer shell of the driver module 90, a driver holder 92, a driver 3, and a microphone substrate 70 on which a microphone 4 is mounted, are accommodated in this order from the front to the rear. Further, a rear end opening of the module case 30 is closed with a closing member 98 made of resin.

The driver holder 92 is integrally provided with an extension portion 94 on the axial direction rear end side (the other end side) of the tubular portion 42. The extension portion 94 is a plate-like member that forms part of the tubular portion 42 and extends rearward from the axial rear end portion of the outer peripheral portion 42B. As with the extension portion 42C of the first embodiment, the extension portion 94 has a second longitudinal groove portion 46C forming the second sound path SP2 at the radially outer surface. However, a microphone fixing portion 96 is provided on the radially inner surface of the extension portion 94, and a microphone substrate 70 is secured by a method such as pressure-sensitive adhesive or clasp-fitting. Further, the extension portion 94 is provided with a side portion through hole 95 that causes the second longitudinal groove portion 46C and the sound hole 4A of the microphone 4 to be communicated with each other.

The closing member 98 has a lid portion 98A that closes the rear end opening of the module case 30 and a holder pressing portion 98B extending axially forward from a case inner surface of the lid portion 98A. The holder pressing portion 98B is formed in a block shape, and the front end part thereof presses the tubular portion 42 axially forward in a state in which the module case 30 is closed. Further, the radially inside side surface of the holder pressing portion 98B presses the microphone 4 and the microphone substrate 70 against the extension portion 94 via a cushion material 100 and supports the extension portion 94. As a result, the positions of the driver 3 and the microphone 4 are stabilized by the closing member 98, and efficiency of assembly is improved. In addition, it is possible to improve the airtightness of the first sound path SP1 and the second sound path SP2.

Since the driver holder 92 having the above-described configuration also essentially conforms to the configuration of the driver holder 40 according to the first embodiment, it is possible to obtain the same mechanism and effects. Further, in the present embodiment, by providing the microphone fixing portion 96 integrally with the driver holder 92, since the configuration is such that a microphone holder configured separately from the driver holder is not required, the number of parts and assembly man-hours for the driver module 90 can be reduced. Further, since the closing member 98 is integrally provided with the holder pressing portion 98B, the positions of the driver 3 and the microphone 4 are stabilized. As a result, the ease of assembly of the driver module 90 can be improved.

Fourth Exemplary Embodiment

Figure 9:
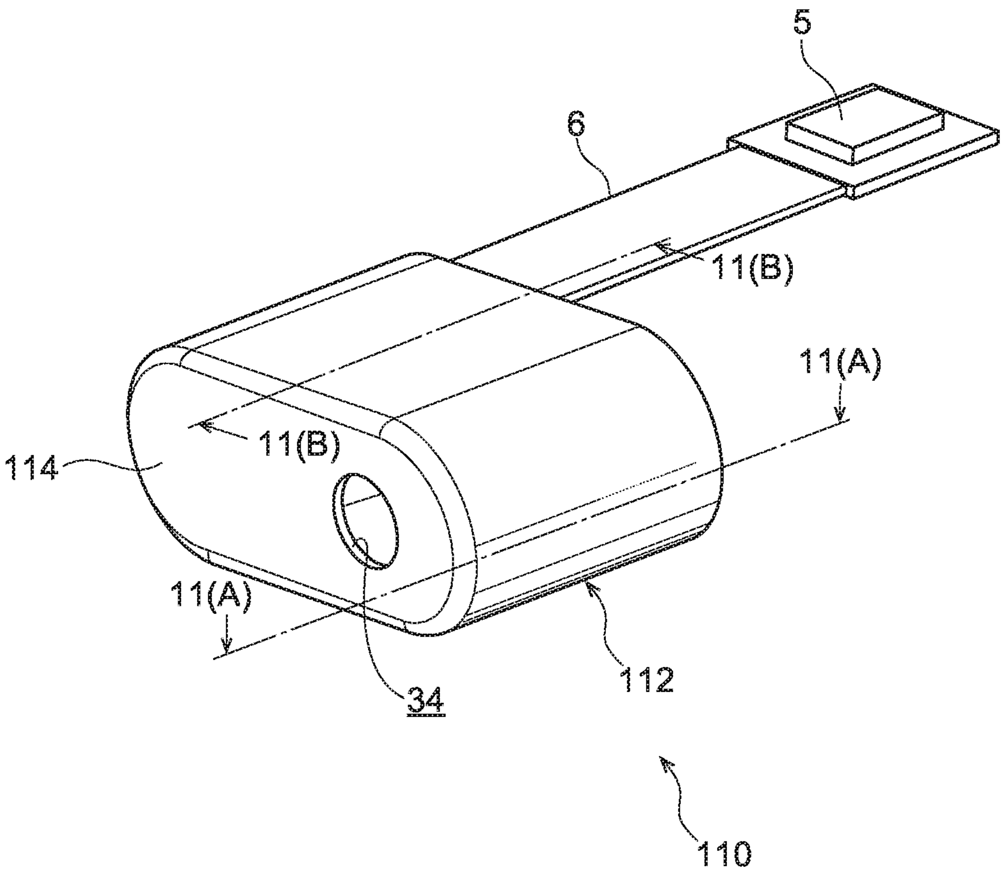
FIG. 9 is a perspective view of a driver module according to a fourth embodiment.
Figure 10:
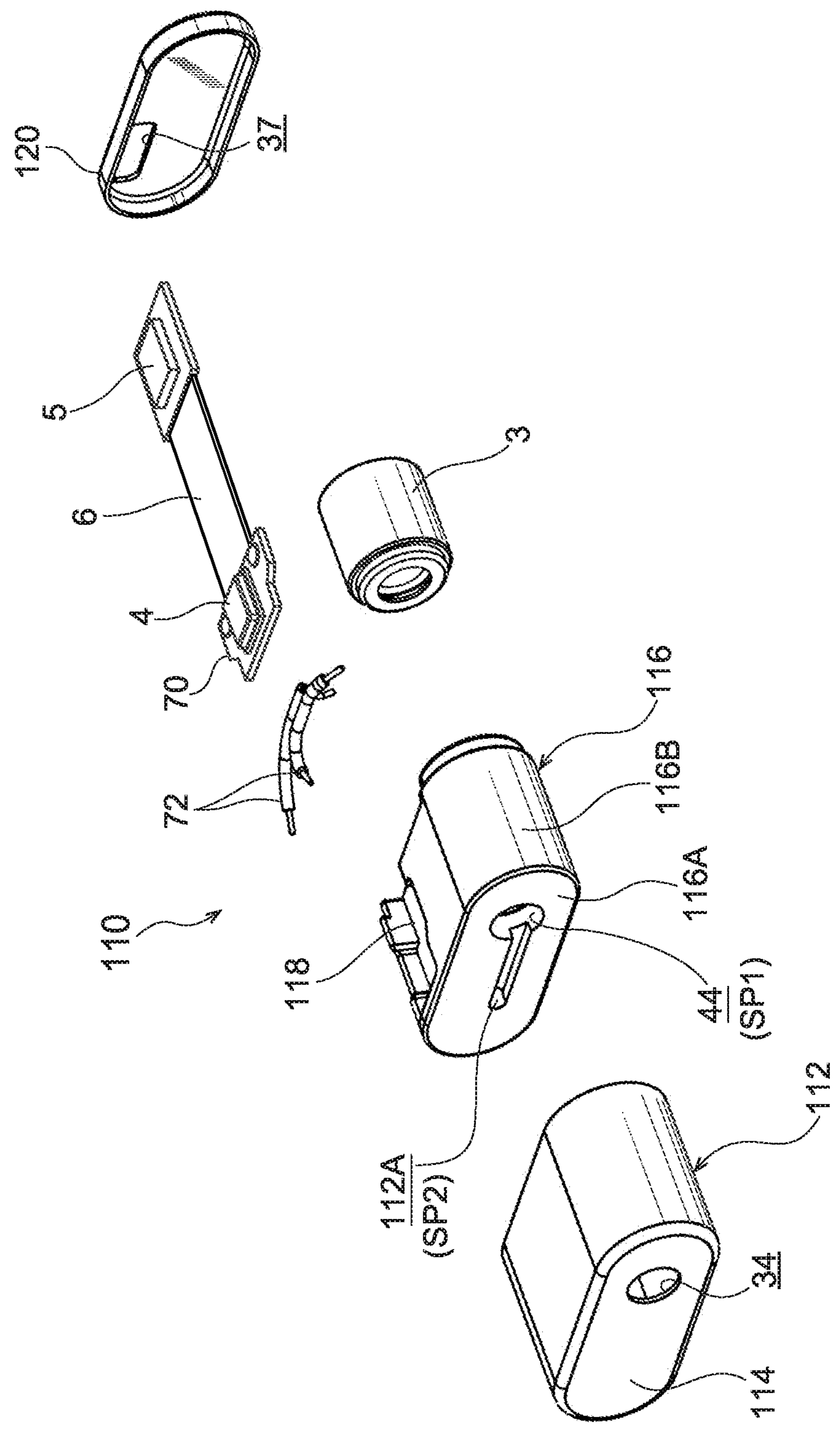
FIG. 10 is an exploded view of the driver module according to the fourth embodiment.

A driver module 110 of the fourth embodiment shown in FIGS. 9 to 11 is characterized in that the microphone 4 is arranged at the side of the driver 3 inside a module case 112. Here, in the fourth embodiment, components that are the same as those in the first exemplary embodiment described above are appended with the same reference numerals, and explanation thereof is omitted.

The module case 112 is formed flat in the left-right direction (direction orthogonal to the axial direction), and is formed in a bottomed tubular shape that is open rearward in the axial direction. A module opening 34 that communicates the inside and outside of the module case 112 is provided at one end side in the left-right direction of the bottom wall 114 of the module case 112. Further, a tubular driver holder 116 formed flat in the left-right direction is press-fitted inside the module case 112.

The driver holder 116 is formed in a tubular shape with one end side in the left-right direction being open to the front and rear in the axial direction, and the inner side thereof configures a driver accommodation portion DC. The driver 3 is inserted into the driver accommodation portion DC through an opening 48 at the rear end side in the axial direction, which is provided so as to correspond to the driver accommodation portion DC. Further, a driver pressing portion 52 is provided integrally with the opening 48. Further, an opening at the front end side in the axial direction provided so as to correspond to the driver accommodation portion DC is configured by a through hole 44 that penetrates the front wall 116A of the driver holder 116 in the axial direction, and the through hole 44 configures the first sound path SP1.

Further, at an outer peripheral portion 116B of the driver holder 116 at the other end in the left-right direction, a recessed accommodation portion serving as a microphone fixing portion 118 is formed. A microphone substrate 70 on which the microphone 4 is mounted is fixed to the microphone fixing portion 118. Further, the microphone substrate 70 and the driver 3 described above are connected by wiring 72 extending in the left-right direction behind the driver holder 116. One end of the flexible substrate 6 is connected to the microphone substrate 70. The other end of the flexible substrate 6 is inserted through the insertion portion 37 of a closing member 120 that closes the module case 112 from behind, and protrudes to the exterior of the module case 112. Here, the configuration may be such that the microphone substrate 70 is not provided, and the microphone is directly fixed to the microphone fixing portion 118.

Figure 11A:
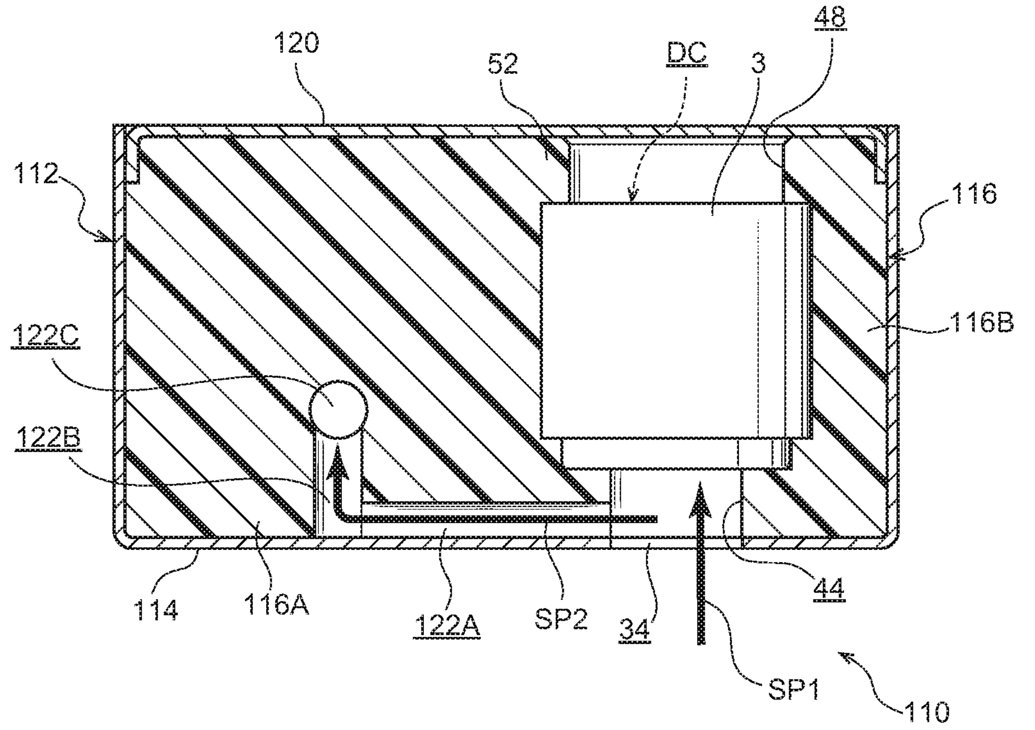
FIG. 11A is a cross-sectional plan view along line 11A-11A in FIG. 9.
Figure 11B:
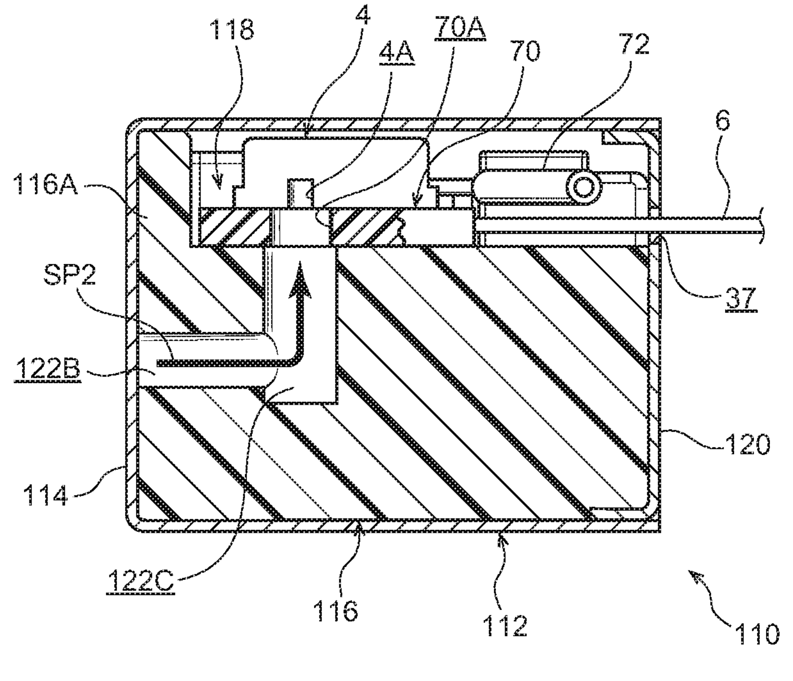
FIG. 11B is a longitudinal sectional view taken along line 11B-11B in FIG. 9.

As shown in FIGS. 11A and 11B, at the bottom surface of the microphone 4, a sound hole 4A that opens toward the side of the microphone fixing portion 118 is formed. The sound hole 4A is communicated with the second sound path SP2 via a through hole 70A penetrating the microphone substrate 70 in the plate thickness direction.

The second sound path SP2 is formed integrally with the driver holder 116. The second sound path SP2 includes one lateral groove portion 122A formed at the surface of the front wall 116A of the driver holder. The lateral groove portion 122A extends from a peripheral portion of the through hole 44 toward the other end side in the left-right direction. Owing to the driver holder 116 being press-fitted into the module case 112 and the front wall 116A of the driver holder 116 abutting on the bottom wall 114 of the module case 112, the lateral groove portion 122A forms a sound path that is communicated with the first sound path SP1. Further, the second sound path SP2 includes a longitudinal hole portion 122B provided continuously with the other end portion in the left-right direction of the lateral groove portion 122A, and a vertical hole portion 122C provided continuously with the rear end portion of the longitudinal hole portion 122B. The longitudinal hole portion 122B extends axially rearward from the front wall 116A of the driver holder 116 and is connected to a lower end of the vertical hole portion 122C. The vertical hole portion 122C penetrates the driver holder 116 toward the side of the microphone fixing portion 118 and is communicated with the sound hole 4A of the microphone 4.

According to the foregoing configuration, the second sound path SP2 is configured by the lateral groove portion 122A, the longitudinal hole portion 122B, and the vertical hole portion 122C, and extends from the first sound path SP1 to the microphone 4. As a result, sound outside the module case 112 reaches the microphone 4 via the first sound path SP1 and the second sound path SP2.

In the present embodiment, as in the first embodiment, since the second sound path SP2 for the microphone is formed by press-fitting the driver holder 116 inside the module case 112, it is possible to easily modify the second sound path SP2 and ensure airtightness, and to improve the ease of assembly.

Further, in the present embodiment, since the microphone 4 is arranged at the side of the driver 3 inside the module case 112, the module case 112 and the driver holder 116 can be made more compact in the axial direction.

Fifth Exemplary Embodiment

Figure 12A:
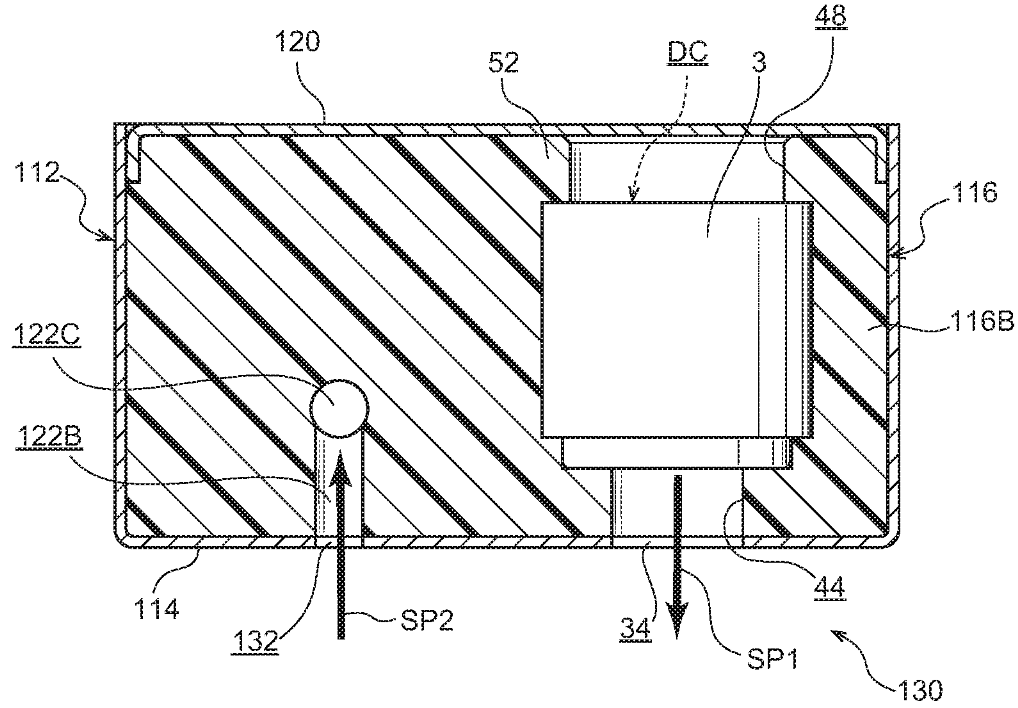
FIG. 12A is a cross-sectional plan view of a driver module according to a fifth embodiment, corresponding to FIG. 11A.
Figure 12B:
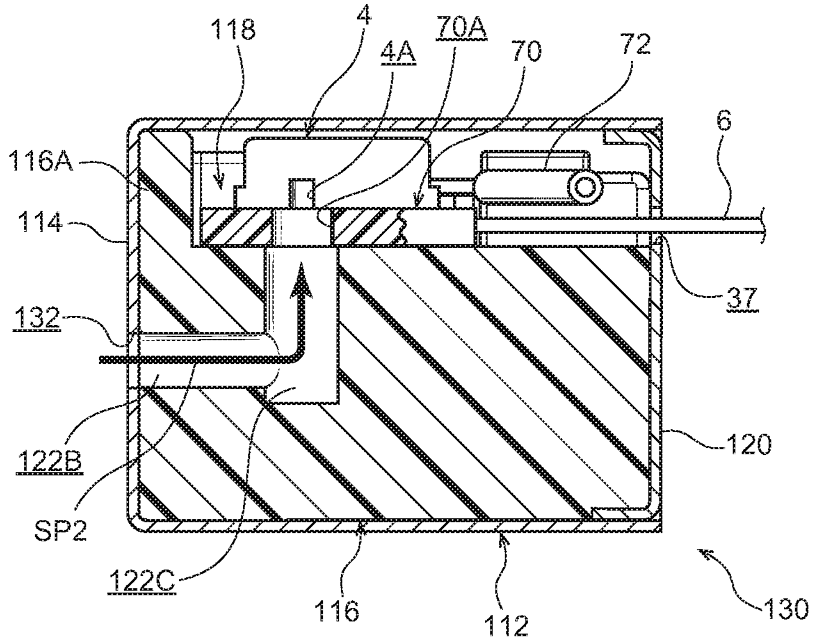
FIG. 12B is a longitudinal sectional view of the driver module according to the fifth embodiment, corresponding to FIG. 11B.

While a driver module 130 of a fifth embodiment shown in FIGS. 12A and 12B essentially conforms to the configuration of the driver module 110 of the fourth embodiment, the configuration differs in that the second sound path SP2 and the first sound path SP1 are not communicated with each other. Here, in the present embodiment, components that are the same as those in the fourth exemplary embodiment are appended with the same reference numerals, and explanation thereof is omitted.

The module case 112 of the driver module 130 has a module opening 34 formed at one end side of the bottom wall 114 in the left-right direction, and a sound path module opening 132 is formed at the other end side in the left-right direction. The sound path module opening 132 is configured by a through hole penetrating the bottom wall 114 in the plate thickness direction, and communicates the outside of the module case 112 with the second sound path portion P2.

The second sound path SP2 is provided to the side of the first sound path SP1 for the driver, and is configured by a longitudinal hole portion 122B and a vertical hole portion 122C which penetrate the front wall 116A and the outer peripheral portion 116B of the driver holder 116.

Since the configuration of the fifth embodiment described above essentially conforms to the configuration of the fourth embodiment, a similar mechanism and effects can be obtained. Further, at the surface of the driver holder 116, since the surface shape of the front wall 116A, which affects the sealing of the first sound path SP1 and the second sound path SP2, can be simplified, the contact surface with the module case 112 is stabilized, and the sealing performance of the respective sound path portions is improved.

Sixth Exemplary Embodiment

A driver module 200 according to a sixth embodiment is explained below with reference to FIGS. 13 and 14. Here, in the present embodiment, components that are the same as those in the first exemplary embodiment described above are appended with the same reference numerals, and explanation thereof is omitted. The driver module 200 according to this sixth embodiment is characterized in that two microphones 400A, 400B can be accommodated inside the module case 210.

Figure 13:
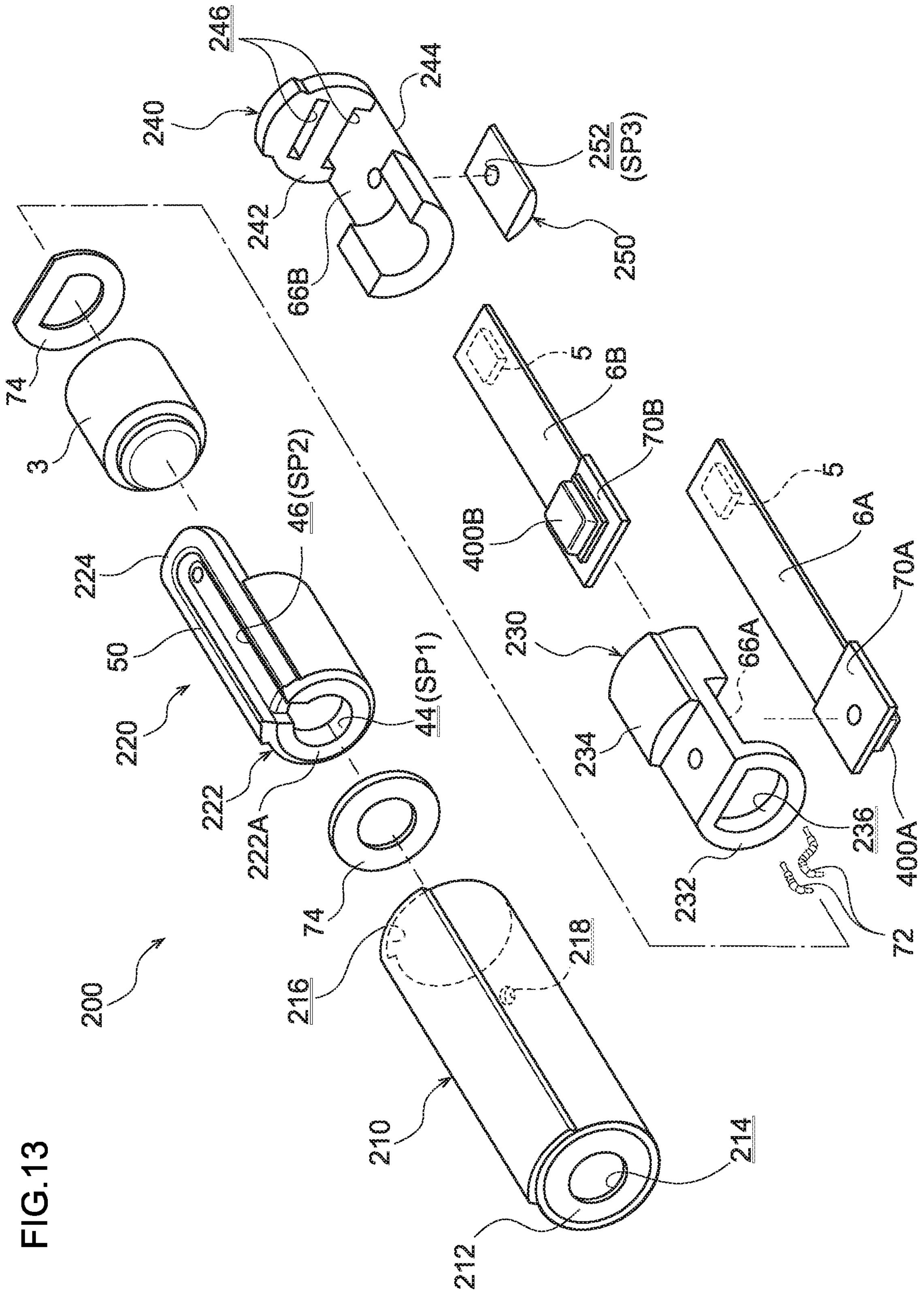
FIG. 13 is an exploded perspective view of a driver module according to a sixth embodiment.

As shown in FIG. 13, inside the module case 210, a driver holder 220, a driver 3, a first microphone holder 230, a first microphone substrate 70A on which the first microphone 400A is mounted, and a second microphone substrate 70B on which a second microphone holder 240 and the second microphone 400B are mounted, are housed in this order from the front to the rear.

The module case 210 is formed in a bottomed tubular shape that is open to the rear in the axial direction, and a module opening 214 that communicates the inside and outside of the module case 210 is provided at the center of the bottom wall 212 of the module case 210. Further, the module case 210 has a sound path accommodation portion 216 formed by protruding a portion of the outer periphery radially outward.

The driver holder 220 is formed in a tubular shape that is open axially to the front and rear, and is press-fitted from the rear opening of the module case 210. The driver holder 220 essentially conforms to the configuration of the driver holder 40 of the first embodiment, and has a cylindrical tubular portion 222 and an extension portion 224 integrally provided at a rear end portion of the tubular portion 222. The first sound path SP1 is formed at a front wall 222A of the tubular portion 222 by a through hole 44 formed therethrough. The second sound path SP2 is formed by a groove portion 46 formed at the surface of the tubular portion 222 and the extension portion 224 so as to communicate with the first sound path portion. Since the configurations of the first and second sound path portions SP1 and SP2 are the same as in the first embodiment, detailed description thereof is omitted.

The driver holder 220 is formed so that the outer peripheral portion at which the second sound path SP2 is formed protrudes in the radial direction and is thicker than other portions. This thick portion is housed in the sound path accommodation portion 216 of the module case 210 when the driver holder 220 is press-fitted into the module case 210. The driver holder 220, by having the second sound path SP2 formed thickly and portions other than the second sound path SP2 made thinner, has a reduced outer diameter and a reduced size. A rib 50 surrounding the second sound path SP2 is further formed at the surface of the driver holder 220, and the leading ends of the ribs 50 are elastically deformed and come into close contact with the inner surface of the sound path accommodation portion 216. As a result, the second sound path SP2 is formed with excellent sealing properties.

Figure 14:
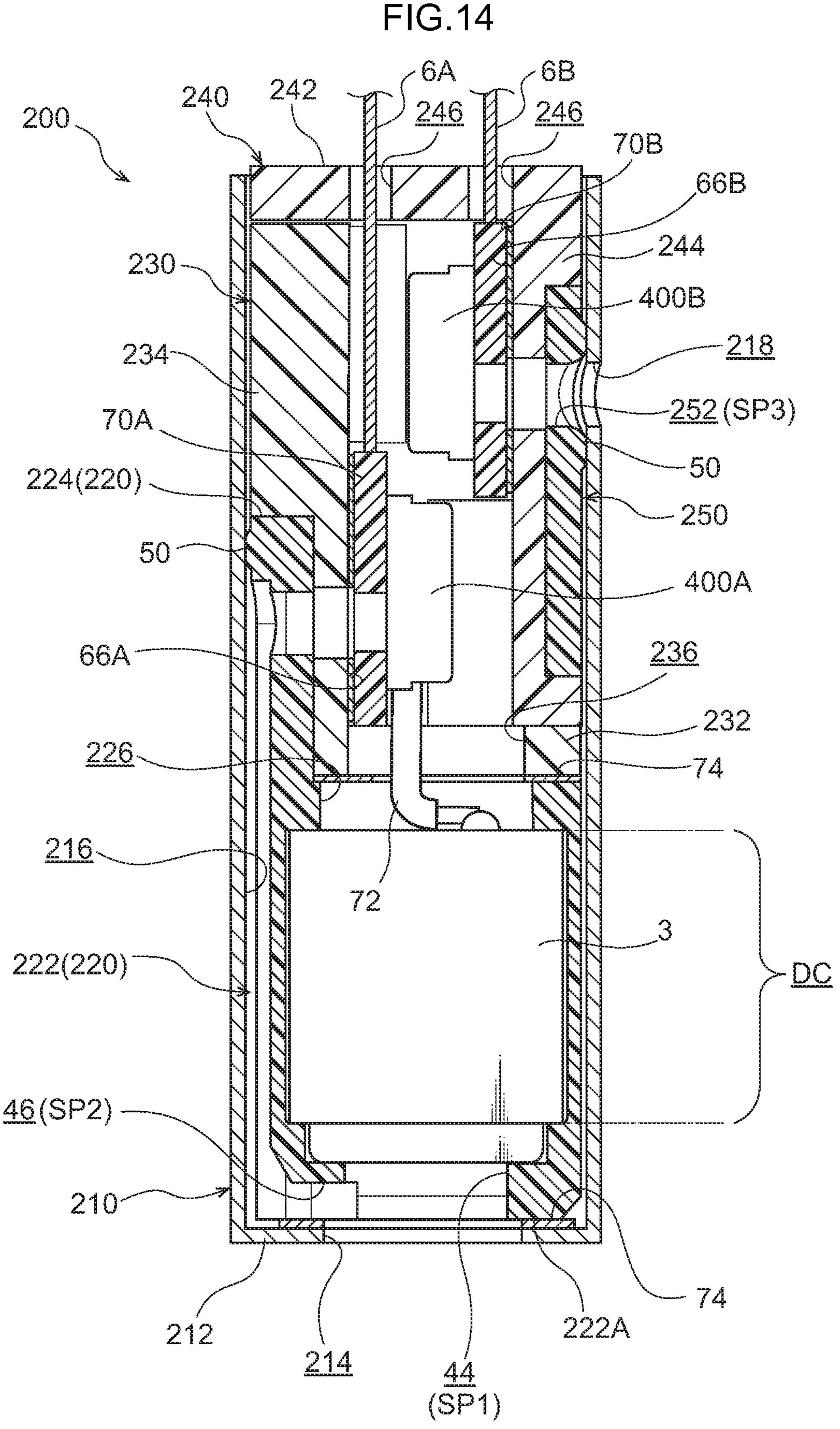
FIG. 14 is an axial direction longitudinal sectional view of the driver module according to the sixth embodiment.

As shown in FIG. 14, inside the driver accommodation portion DC formed inside the tubular portion 222 of the driver holder 220, the driver 3 is inserted from the opening 226 at the rear end side of the tubular portion 222, and the first microphone holder 230 is disposed behind the driver 3. The first microphone holder 230 essentially conforms to the configuration of the microphone holder 60 of the first embodiment, and a lower wall portion 232 abutting on the rear surface of the driver holder 220, and a longitudinal wall portion 234 standing axially rearward from the upper surface of the lower wall portion 232, form a plate-like member bent in a substantial L-shape.

The lower wall portion 232 has an opening 236 penetrating in the axial direction (thickness direction) thereof, and wiring 72 connected to the rear surface of the driver 3 is drawn rearward through the opening 236. The extension portion 224 of the driver holder 220 abuts on an outer surface of the longitudinal wall 234 facing the inner surface of the module case 210, the longitudinal wall 234 forming a curved surface that is substantially flush with the extension portion 224. A first microphone fixing portion 66A is provided at an inner surface of the longitudinal wall portion 234 provided on the opposite side from this outer surface. A first microphone substrate 70A is fixed to the first microphone fixing portion 66A using a pressure-sensitive adhesive.

The first microphone substrate 70A is arranged in a longitudinal orientation similarly to the microphone substrate 70 of the first embodiment, and the first microphone 400A is mounted on a mounting surface of the first microphone substrate 70A at an opposite side from the first microphone fixing portion 66A. The sound hole of the first microphone 400A is communicated with the second sound path SP2 via a through hole formed penetrating each of the first microphone substrate 70A, the longitudinal wall portion 234 of the first microphone holder 230, and the extension portion 224 of the driver holder 220. As a result, sound (vibration) in the ear canal reaches the first microphone 400A via the second sound path SP2. The first microphone 400A is used, for example, for feedback-type noise cancellation. The first microphone substrate 70A is connected to an elongated sheet-like first flexible board 6A, and is electrically connected to the printed circuit board 2 inside the housing 10 via a connector 5 provided at the leading end of the first flexible circuit board 6A.

A second microphone holder 240 is disposed behind the first microphone holder 230. As with the first microphone holder 230, the basic component elements of the second microphone holder 240 also conform to the configuration of the microphone holder 60 of the first embodiment, and a lower wall portion 242 and a longitudinal wall portion 244 form a plate-like member bent in a substantial L-shape.

The second microphone holder 240 is arranged in a reversed orientation from that of the first microphone holder 230 in the front-rear direction, and is housed inside the module case 210 in an inverted posture relative to the first microphone holder 230. In this state, the longitudinal wall portions 234 and 244 of the first and second microphone holders 230 and 240 are arranged facing each other inside the module case 210. Further, the lower wall portion 242 of the second microphone holder 240 abuts on the rear surface of the longitudinal wall portion 234 of the first microphone holder 230, and the opening on the rear end side of the module case 210 is closed off by the lower wall portion 242. In this lower wall portion 242, two insertion portions 246 are formed for insertion of the first flexible substrate 6A connected to the first microphone substrate 70A and of a second flexible substrate 6B connected to the second microphone substrate 70B, which is described below.

A sheet-like gasket 250 abuts on the outer surface of the longitudinal wall portion 244 facing the inner surface of the module case 210, and forms a curved surface that is substantially flush with the outer surface of the longitudinal wall portion 244. This gasket 250 is formed using a similar elastic material to the driver holder 220, and in the present embodiment, an elastomer material such as TPE or TPU is used, as an example. This gasket 250 is disposed in a state of being press-fitted between the longitudinal wall portion 244 of the second microphone holder 240 and the module case 210. Further, by bringing the respective faces of the gasket 250 into close contact with the outer surface of the longitudinal wall portion 244 and the inner surface of the module case 210, a sealed third sound path SP3 is formed, communicating the inside and outside of the module case 210. The third sound path SP3 is configured by a through hole 252 formed penetrating the gasket 250. By arranging the through hole 252 coaxially with the through hole 218 formed at the outer periphery of the module case 210, at an outer side the user's ear canal, the inside and outside of the module case 210 are communicated with each other. Here, a rib 50 surrounding the third sound path SP3 is formed at the surface of the gasket 250, similarly to in the driver holder 220, and the leading ends of the rib 50 are elastically deformed and adhere to the inner surface of the module case 210.

A second microphone fixing portion 66B is provided at an inner surface of the longitudinal wall portion 244 provided at an opposite side from the outer surface of the second microphone holder 240. A second microphone substrate 70B is fixed to the second microphone fixing portion 66B using a pressure-sensitive adhesive. The second microphone substrate 70B is arranged in a longitudinal orientation similarly to the first microphone substrate 70A, and is disposed at the rear side of the first microphone substrate 70A. The second microphone 400B is mounted on a mounting surface of the second microphone substrate 70B at an opposite side from the second microphone fixing portion 66B. The sound hole of the second microphone 400B is communicated with the third sound path SP3 via through holes (reference numerals are omitted for each of these) formed through the longitudinal wall portion 244 of the second microphone substrate 70B and the second microphone holder 240, respectively. As a result, sound (vibration) outside the ear canal reaches the second microphone 400B via the second sound path SP3. The second microphone 400B is used, for example, for feed-forward-type noise cancellation. The second microphone substrate 70B is connected to an elongated sheet-like second flexible board 6B, and is electrically connected to the printed circuit board 2 inside the housing 10 via a connector 5 provided at the leading end of the second flexible circuit board 6B.

In the assembly of the driver module 200 according to the sixth embodiment described above, the driver 3 is housed in the driver holder 220 in advance, and the assembly begins in a state in which the first microphone substrate 70A, the first microphone 400A and the first flexible board 6A are fixed to the first microphone holder 230. Further, the driver holder 220 and the first microphone holder 230 are fixed using the pressure sensitive adhesive 74, and the assembly is press-fitted into the module case 210. After this, the second microphone holder 240, in a state in which the second microphone substrate 70B, the second microphone 400B, the second flexible board 6B and the gasket 250 are fixed in advance thereto, is inserted into the module case 210, and by closing the opening at the rear end side of the module case 210 with the second microphone holder 240, assembly is completed. Here, the pressure sensitive adhesive 74 is also arranged between the module case 210 and the driver holder 220.

Since the driver module 200 having the foregoing configuration essentially conforms to the configuration of the driver module 9 of the first embodiment, a similar mechanism and effects can be obtained. Further, in the present embodiment, the first microphone 400A used for feedback-type noise canceling and the second microphone 400B used for feedforward-type noise canceling are modularized integrally with the driver 3, and the noise canceling performance can be improved.

Further, according to the present embodiment, the first microphone holder 230 and the second microphone holder 240 are configured by approximately L-shaped plate-shaped members arranged in reversed orientations, and are accommodated in the module case 210 in mutually inverted postures. As a result, the accommodation space for the first and second microphones 400A, 400B can be reduced in the axial direction, and the size of the module case 210 can be reduced. Here, in the embodiment described above, the first microphone 400A and the second microphone 400B are arranged next to each other in the front-rear direction in the module case 210; however, there is no limitation to this, and it is also possible to make the module case 210 more compact in the axial direction by adopting a configuration in which the first microphone 400A and the second microphone 400B are arranged so as to face each other.

Further, in the embodiment described above, the first microphone 400A is used for noise cancellation; however, there is no limitation to this, and it may be used as a vibration sensor for measuring vibrations in audible and non-audible frequency bands, pressure changes, or the like, in the ear canal.

Seventh Exemplary Embodiment

A driver module 300 according to a seventh embodiment and a headset 302 using the driver module 300 are explained below with reference to FIGS. 15 to 19. Here, in the present embodiment, components that are the same as those in the first exemplary embodiment described above are appended with the same reference numerals, and explanation thereof is omitted. The driver module 300 according to the seventh embodiment is characterized in that a part of the module case 310 is exposed from the housing 304.

Figure 15:
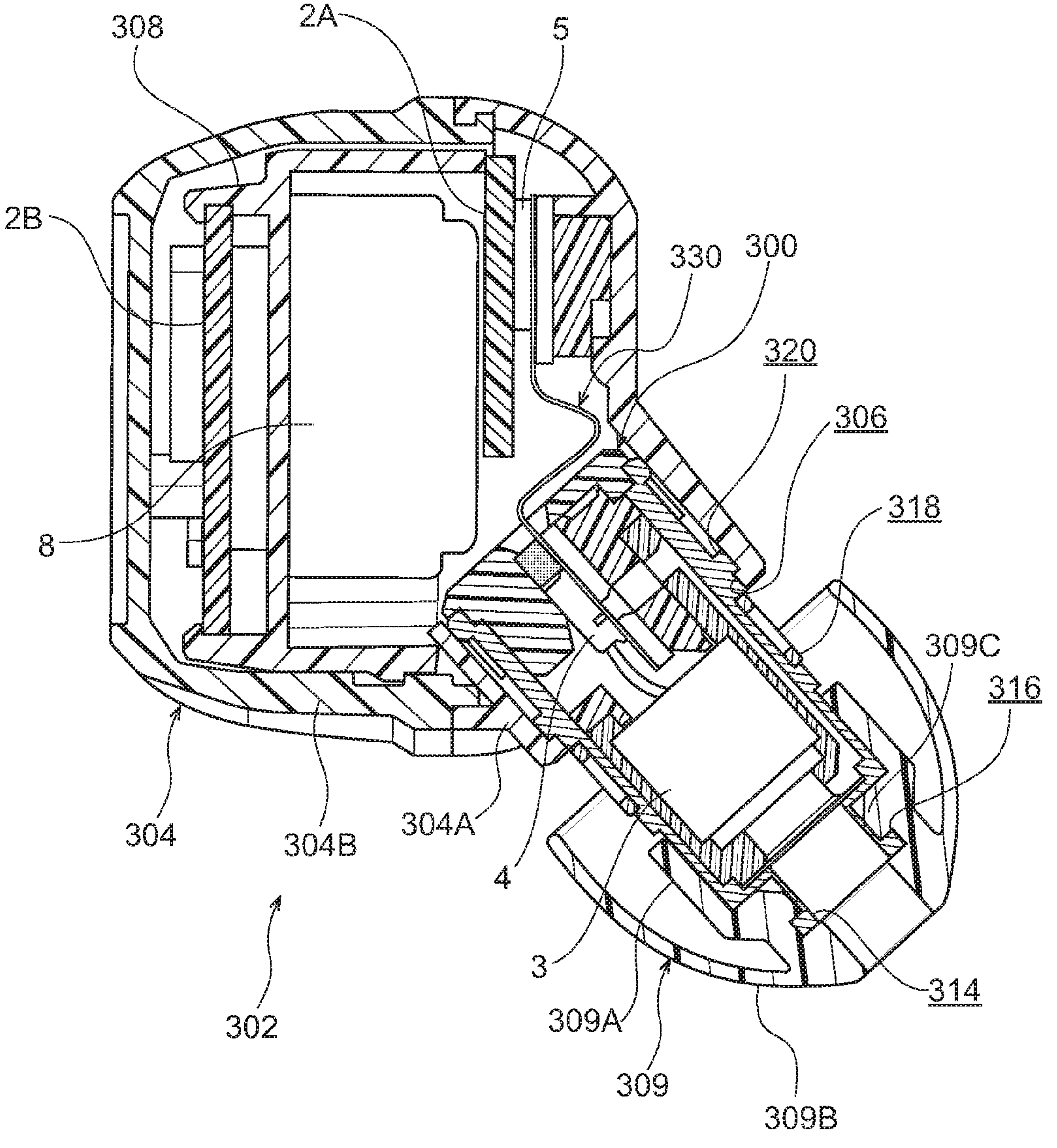
FIG. 15 is a cross-sectional view showing the overall configuration of a headset according to a seventh embodiment.

As shown in FIG. 15, the headset 302 has a hollow housing 304 accommodating functional components thereinside. The housing 304 is formed by fitting together a front housing 304A and a rear housing 304B. The front housing 304A is formed in a tubular shape having an oblique truncated cone outer shape as a whole, and a housing opening 306 that communicates the inside and outside of the front housing 304A is provided at an apex of the oblique truncated cone. A driver module 300 is inserted into this housing opening 306. The rear housing 304B is formed in the shape of a shallow dish that opens forward, and is disposed so as to close off the rear opening of the front housing 304A.

A box-shaped inner housing 308 opening forward is accommodated in an accommodation space formed by the front housing 304A and the rear housing 304B, and a battery 8 is held inside the inner housing 308. Further, a first printed circuit board 2A is arranged at a front side of the inner housing 308 in the accommodation space, and a second printed circuit board 2B is arranged at a rear side of the inner housing 308. The first and second printed circuit boards 2A and 2B are arranged in an orientation in which the board thickness direction is substantially the front-rear direction, and electronic components necessary for controlling the headset 302 are mounted on respective mounting surfaces. At the first printed circuit board 2A arranged at the front side of the inner housing 308, a charging terminal 7 (not shown in FIG. 15) of the headset 302, and a substrate assembly 330 connected to the driver module 300 via a connector 5 are connected.

At the housing opening 306 formed at the front end of the front housing 304A, a module case 310 forming an outer shell of the driver module 300 is inserted. The module case 310 is formed in a bottomed tubular shape that is open rearward, and a module opening 314 that communicates the inside and outside of the module case 310 is provided in the center of the bottom wall 312 that configures the front end part. The leading end of the module case 310 protrudes forward from the front housing 304A and is disposed in the user's ear canal.

Here, an earpiece 309 is attached to the leading end (front end) of the module case 310. The earpiece 309 has a cylindrical portion 309A fitted to the outer periphery of the module case 310, and a hemispherical cover-like contact portion 309B integrally provided at the leading end of the cylindrical portion 309A. A first groove portion 316 annularly formed along the circumferential direction is formed at the leading end of the module case 310, and the earpiece 309 is attached to the module case 310 by fitting a fitting projection 309C, provided at the inner circumference of the cylindrical portion 309A of the earpiece 309, into the first groove portion 316.

Figure 16:
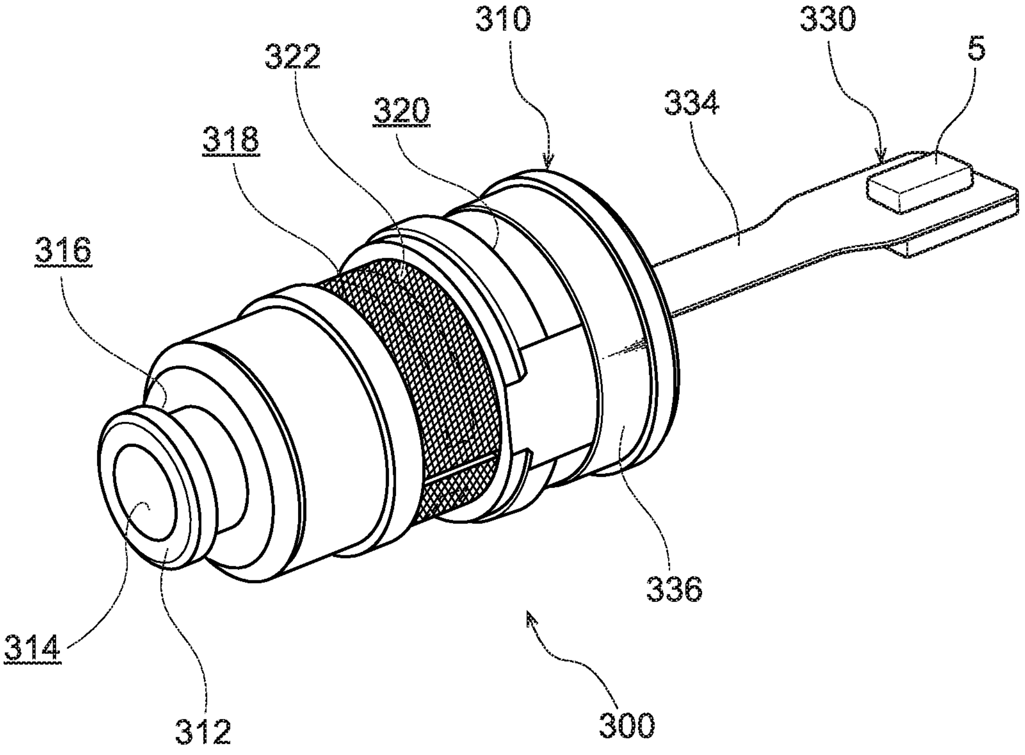
FIG. 16 is a perspective view of a driver module according to a seventh embodiment.

As shown in FIG. 16, an annular second groove portion 318 is formed at an intermediate portion of the module case 310. The second groove portion 318 is formed with a vent hole 319 (see FIG. 17) that communicates the inside and outside of the module case 310, and the driving of the driver 3 is optimized by adjusting the air pressure inside the module case 310. An annular vent cover 322 made of a mesh material is attached to the second groove portion 318, which prevents intrusion of external foreign matter through the vent hole 319. Furthermore, an annular third groove portion 320 is formed at the rear end portion of the module case 310. An annular third substrate portion 336 that configures a substrate assembly 330, which is described below, is mounted in the third groove portion 320.

Figure 17:
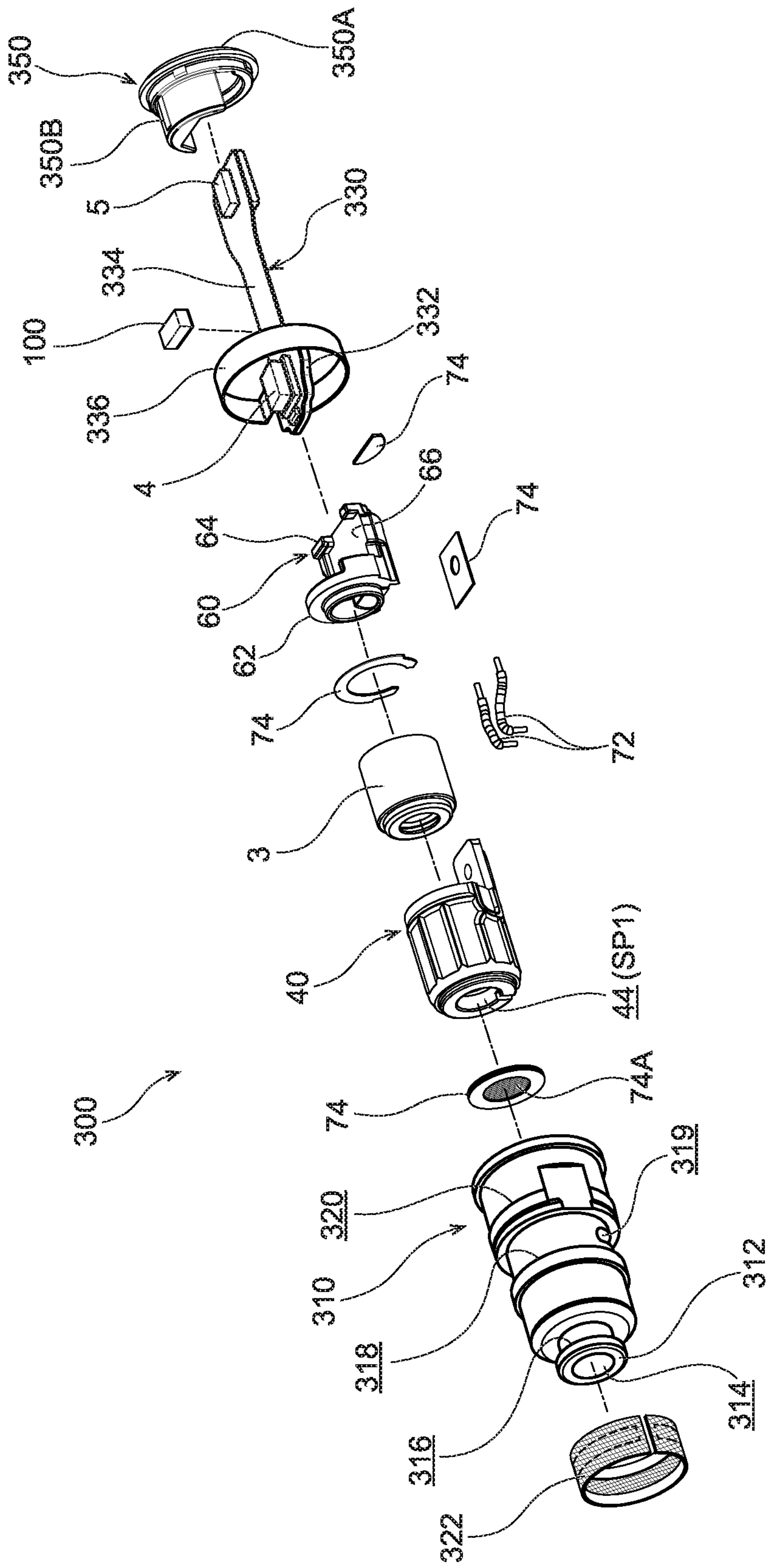
FIG. 17 is an exploded perspective view of the driver module according to the seventh embodiment.

As shown in FIG. 17, inside the module case 310, a driver holder 40, a driver 3, a microphone holder 60, and the substrate assembly 330 on which a microphone 4 is mounted, are accommodated in this order from the front to the rear, and the rear opening of the module case 310 is closed off by a closing member 350. Since the configurations of the driver holder 40, the driver 3, and the microphone holder 60 are similar to those of the first embodiment, detailed explanation is omitted.

Figure 18:
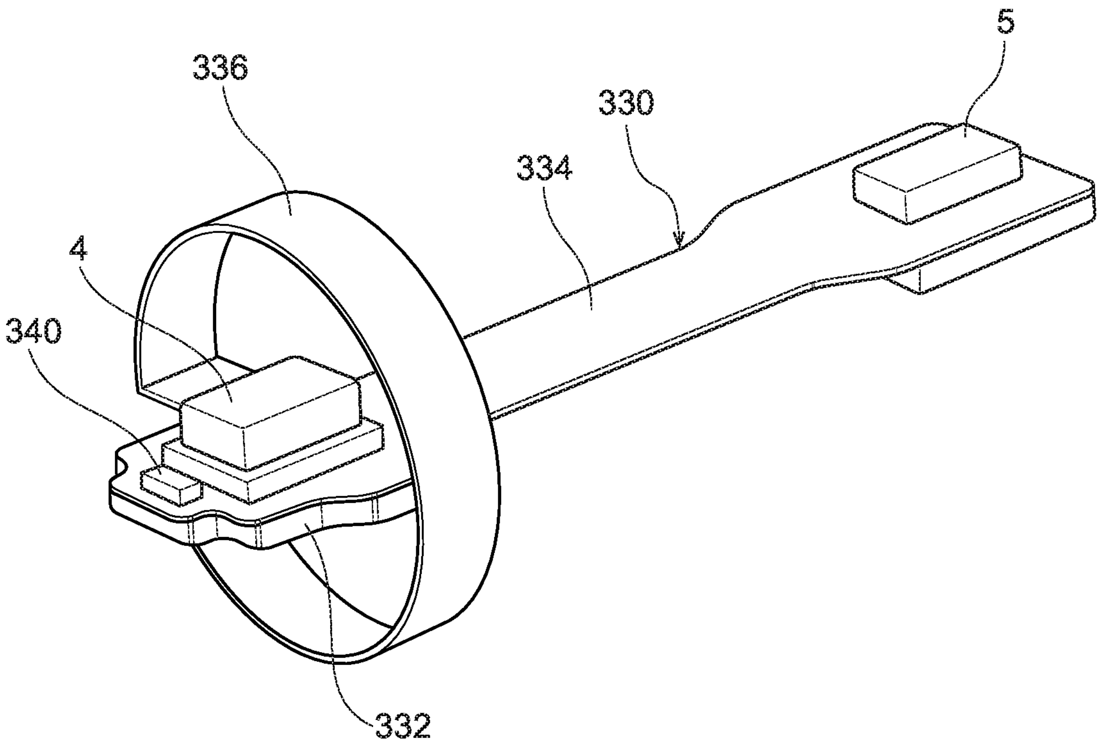
FIG. 18 is a perspective view of a substrate assembly according to the seventh embodiment.

As shown in FIG. 18, the substrate assembly 330 is formed by connecting a plate-like printed board and a sheet-like flexible board, and is provided with a first substrate portion 332, a second substrate portion 334 and a third substrate portion 336. The first substrate portion 332 is configured by a plate-shaped printed circuit board, and is fixed to the microphone fixing portion 66 of the microphone holder 60. The first substrate portion 332 is arranged in the module case 310 in a longitudinal orientation, similarly to the microphone board 70 of the first embodiment. The microphone 4 is mounted on a mounting surface of the first substrate portion 332 at an opposite side from the microphone fixing portion 66. A sound hole of the microphone 4 is communicated with the second sound path SP2 via through holes (not provided with reference numerals) formed penetrating each of the first substrate portion 332, the longitudinal wall portion 64 of the first microphone holder 60, and the extension portion 224 of the driver holder 40. A thermistor 340 for measuring the ambient temperature of the driver module 300 is mounted on the mounting surface of the first substrate portion 332 in addition to the microphone 4.

The second substrate portion 334 is formed with an elongated sheet shape extending from an end portion of the first substrate portion 332 along the axial direction of the module case 310, and is configured by a flexible substrate. The leading end of the second substrate portion 334 is electrically connected to the first printed board 2A inside the housing 304 via the connector 5.

The third substrate portion 336 is formed with an elongated sheet shape extending from an end portion of the first substrate portion 332 along the circumferential direction of the module case 310, and is configured by a flexible substrate. The third substrate portion 336 has a pad, which can be used for a capacitive-sensing-method proximity sensor, for example. In such a case, by forming the module case 310 from a metal material, the capacitance can be further increased, and the performance of the proximity sensor can be improved. The third substrate portion 336 is drawn out to the exterior through a slit 324 (see FIG. 19) formed in the outer periphery of the module case 310, and is mounted in the annular third groove portion 320.

Figure 19:
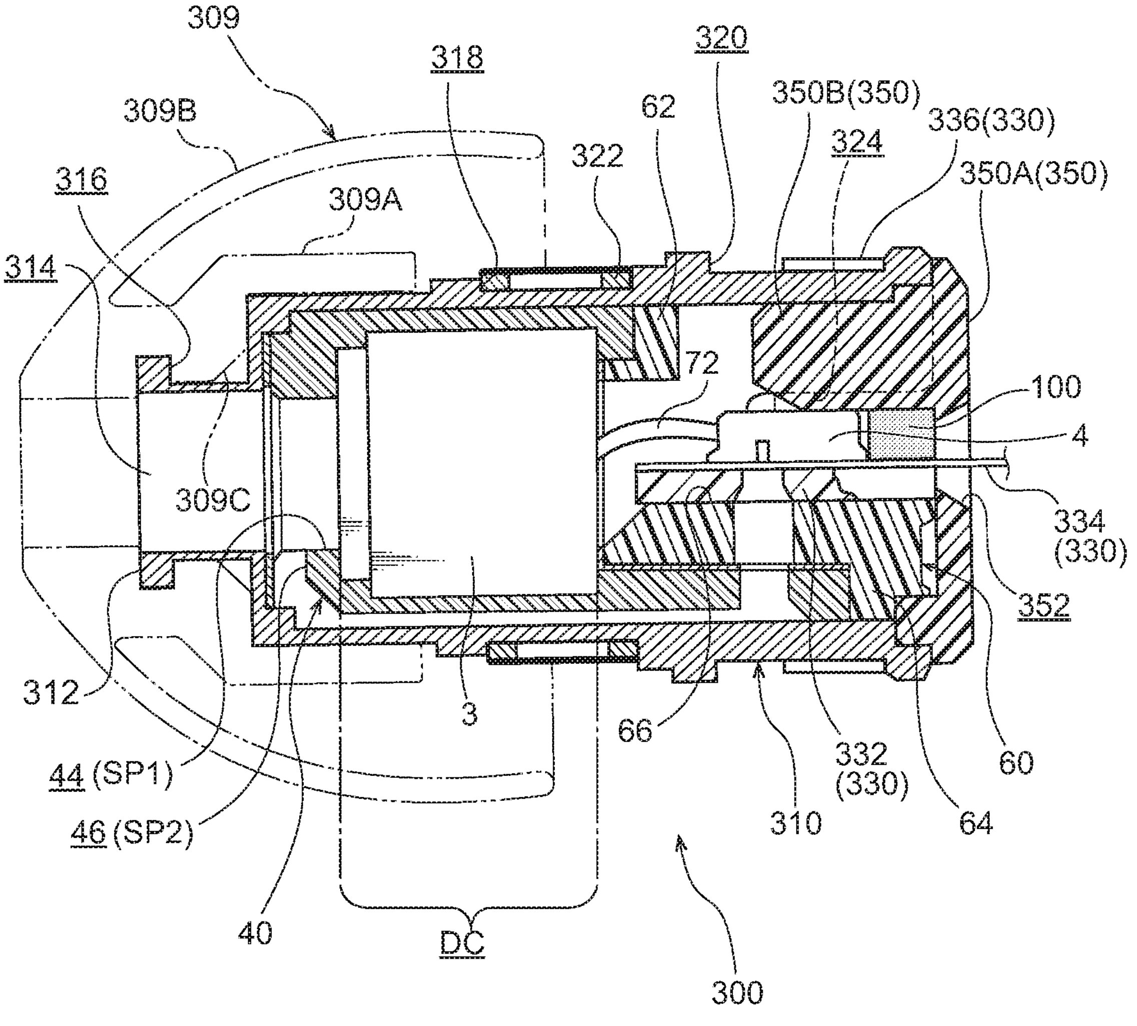
FIG. 19 is an axial direction longitudinal sectional view of the driver module according to the seventh embodiment.

As shown in FIG. 19, a closing member 350 is arranged at the rear side of the microphone holder 60. The closing member 350 has a lid portion 350A that closes off the opening at the rear end side of the module case 310, and a holder pressing portion 350B erected on the front side in the axial direction from a surface at a case inner side of the lid portion 350A. Since the basic configuration of the closing member 350 conforms to the configuration of the closing member 98 according to the third embodiment, detailed explanation is omitted; however, in a state in which the module case 310 is closed by the lid portion 350A, the longitudinal wall portion 64 of the microphone holder 60 and the holder pressing portion 350B are arranged facing each other inside the case, and the first substrate portion 332 provided with the microphone 4 is arranged between the longitudinal wall portion 64 and the holder pressing portion 350B. The holder pressing portion 350B presses the longitudinal wall portion 64 of the microphone holder 60 via the first substrate portion 332 with a lateral direction (radial direction) force, and the driver holder 40 is brought into close contact with the module case 310. Further, the second substrate portion 334 of the substrate assembly 330 is drawn out to the exterior of the module case 310 through an insertion portion 352 formed through the lid portion 350A.

Assembly of the driver module 300 according to the seventh embodiment begins in a state in which the driver 3 is housed in the driver holder 40 in advance, and the first substrate portion 332 of the substrate assembly 330 is fixed to the microphone holder 60. Further, the driver holder 40 and the microphone holder 60 are fixed using the pressure sensitive adhesive 74, and the assembly is press-fitted into the module case 310. At this time, the third substrate portion 336 of the substrate assembly 330 is drawn out from the slit 324 of the module case 310, and is wound onto the third groove portion 320 at the outer periphery of the module case 310. After this, the opening on the rear end side of the module case 310 is closed off by the closing member 350 and the assembly is complete. At the ring-shaped pressure-sensitive adhesive 74 that bonds the driver holder 40 and the microphone holder 60, a front mesh 74A is provided that covers the module opening 314 of the module case 310 and prevents waste matter and the like from entering. Further, the pressure sensitive adhesive 74 is also disposed between the module case 310 and the driver holder 40 and between the microphone holder 60 and the closing member 350.

Since the driver module 300 having the foregoing configuration essentially conforms to the configuration of the driver module 9 of the first embodiment, a similar mechanism and effects can be obtained. Further, in the present embodiment, a portion of the driver module 300 is arranged outside of the housing 304, and a leading end side exposed from the housing 304 is inserted into the user's ear canal. That is, the module case 310 configures the ear canal insertion portion of the headset 302. This makes it possible to easily meet the demand for a reduced diameter of the ear canal insertion portion of the headset 302.

Supplementary Explanation

While examples of embodiments of the present disclosure have been explained above, the present disclosure can be modified as appropriate without departing from the gist of the invention, and omission, replacement, and modification of the configurations in the respective embodiments described above can be performed.

For example, in the foregoing embodiments, the driver holders 40, 80, 92, 116, 220 and the gasket 250 are formed with an elastomer material; however, the present disclosure is not limited to this, and any elastic material that can be elastically deformed may be used. For example, they may be made of silicone rubber. Further, in a case in which the configuration of the present disclosure is a driver holder made of conductive silicone in which a conductive filler is mixed into silicone rubber, it is possible to prevent the generation of static electricity when assembling the driver module and when using the headset.

Further, although the ribs 50A, 50B, and 50C are configured by triangular ribs in each of the foregoing embodiments, the present disclosure is not limited to this. The shape of the ribs may be hemispherical or trapezoidal.

Further, in the first to sixth embodiments described above, the driver modules 9, 90, 200 are arranged inside the ear canal insertion portion 16; however, the present disclosure is not limited to this. The driver modules 9, 90 may be arranged in the eardrum-side portion of the housing 10; for example, behind the ear canal insertion section 16. Alternatively, as in the driver module 300 of the seventh embodiment, a part of the driver module 300 may be exposed outside of the housing 304.

Further, in each of the foregoing embodiments, the driver 3 and the microphones 4, 400A, 400B are housed in the module case 30; however, the present disclosure is not limited to this. Parts other than the driver 3 and the driver holder 40, such as the microphone 4, may be arranged outside the module case 30. Further, the microphone 4 is not limited to a configuration arranged at the rear side of the driver 3, and may be arranged at a side of the driver.

Further, in each of the above-described embodiments, the holder insertion portion is configured by the module case 30; however, the present disclosure is not limited to this. The holder insertion portion may be configured so as to be provided in the housing 10. For example, the ear canal insertion portion 16 may be configured as a holder insertion portion, and the driver holder 40 may be directly press-fitted into the ear canal insertion portion 16. Alternatively, behind the ear canal insertion portion 16 inside the housing 10, a bottomed tubular accommodation portion communicated with the ear canal insertion portion may be integrally formed, and the accommodation portion may be used as the holder insertion portion.

Further, the housings 10, 304 in each of the embodiments described above are merely examples, and any housing that accommodates components of the headset at the interior thereof may be used. The shape and size of the housing can be changed in various ways. Further, although the headset of the foregoing embodiments is a wireless headset, the present disclosure is not limited to this, and the headset may be connected to a terminal via a wire. Further, the headset may be for both ears or for one ear. Further, the driver module and driver holder of the foregoing embodiments may be applied to wearable devices.

The disclosure of Japanese Patent Application No. 2020-170811 filed on Oct. 8, 2020, is incorporated herein by reference in its entirety.

All publications, patent applications and technical standards mentioned herein are incorporated herein by reference to the same extent as if each individual publication, patent application and technical standard were specifically and individually indicated to be incorporated by reference.

The invention claimed is:

1. A driver module comprising:

a driver;

a microphone having a sound hold for sound collection;

a driver holder for holding the driver at an interior of a hollow housing, the driver holder comprising:

a tubular portion formed in a tubular shape, the driver being accommodated at an inner side thereof, and the tubular portion being configured to be press-fitted into a holder insertion portion disposed inside the housing, a first sound path configuring an opening at one end side in an axial direction of the tubular portion, and communicating the driver with an exterior of the driver holder, and a second sound path configured by a groove formed at a surface of the tubular portion, the second sound path being communicated with the first sound path and extending as far as the microphone disposed at an outer side of the tubular portion, wherein the microphone is disposed at a rear side with respect to the driver, such that the sound hold is positioned within a range at which the tubular portion is formed when seen in front-rear direction.

2. The driver module of claim 1, wherein the driver module is formed with an elastic material.

3. The driver module of claim 2, wherein:

a rib projecting from the surface is formed at the surface of the tubular portion, and the tubular portion is press-fitted into the holder insertion portion while elastically deforming the rib.

4. The driver module of claim 2, wherein:

a driver pressing portion is provided at the tubular portion, the driver pressing portion protruding toward an inner side in a radial direction from an opening at another end side in the axial direction at which the driver is inserted, and the driver is accommodated inside the tubular portion by surmounting the driver pressing portion, and is pressed toward one side in the axial direction by elastic force of the driver pressing portion.

5. The driver module of claim 2, wherein a plurality of the grooves is formed at the surface of the tubular portion.

6. The driver module of claim 2, wherein:

the holder insertion portion is configured by a bottomed tubular module case, and the tubular portion is press-fitted inside the module case.

7. The driver module of claim 1, wherein:

a rib projecting from the surface is formed at the surface of the tubular portion, and the tubular portion is press-fitted into the holder insertion portion while elastically deforming the rib.

8. The driver module of claim 7, wherein:

a driver pressing portion is provided at the tubular portion, the driver pressing portion protruding toward an inner side in a radial direction from an opening at another end side in the axial direction at which the driver is inserted, and the driver is accommodated inside the tubular portion by surmounting the driver pressing portion, and is pressed toward one side in the axial direction by elastic force of the driver pressing portion.

9. The driver module of claim 7, wherein a plurality of the grooves is formed at the surface of the tubular portion.

10. The driver module of claim 7, wherein:

the holder insertion portion is configured by a bottomed tubular module case, and the tubular portion is press-fitted inside the module case.

11. The driver module of claim 1, wherein:

a driver pressing portion is provided at the tubular portion, the driver pressing portion protruding toward an inner side in a radial direction from an opening at another end side in the axial direction at which the driver is inserted, and the driver is accommodated inside the tubular portion by surmounting the driver pressing portion, and is pressed toward one side in the axial direction by elastic force of the driver pressing portion.

12. The driver module of claim 11, wherein a plurality of the grooves is formed at the surface of the tubular portion.

13. The driver module of claim 11, wherein:

the holder insertion portion is configured by a bottomed tubular module case, and the tubular portion is press-fitted inside the module case.

14. The driver module of claim 1, wherein a plurality of the grooves is formed at the surface of the tubular portion.

15. The driver module of claim 14, wherein:

the holder insertion portion is configured by a bottomed tubular module case, and the tubular portion is press-fitted inside the module case.

16. A headset, comprising the driver module of claim 1.

17. A driver holder for holding a driver at an interior of a hollow housing, the driver holder comprising:

a tubular portion formed in a tubular shape, the driver being accommodated at an inner side thereof, and the tubular portion being configured to be press-fitted into a holder insertion portion disposed inside the housing;

a first sound path configuring an opening at one end side in an axial direction of the tubular portion, and communicating the driver with an exterior of the housing; and a second sound path configured by a groove formed at a surface of the tubular portion, the second sound path being communicated with the first sound path and extending as far as a microphone disposed at an outer side of the tubular portion, wherein a plurality of the grooves is formed at the surface of the tubular portion.

18. A headset, comprising the driver holder of claim 17.

19. A driver holder for holding a driver at an interior of a hollow housing, the driver holder comprising:

a tubular portion formed in a tubular shape, the driver being accommodated at an inner side thereof, and the tubular portion being configured to be press-fitted into a holder insertion portion disposed inside the housing;

a first sound path configuring an opening at one end side in an axial direction of the tubular portion, and communicating the driver with an exterior of the housing; and a second sound path configured by a groove formed at a surface of the tubular portion, the second sound path being communicated with the first sound path and extending as far as a microphone disposed at an outer side of the tubular portion, wherein the holder insertion portion is configured by a bottomed tubular module case, and the tubular portion is press-fitted inside the module case.

20. A headset, comprising the driver holder of claim 19.

* * * * *